United States Patent
Czajkowski

(10) Patent No.: US 11,046,135 B2
(45) Date of Patent: Jun. 29, 2021

(54) REINFORCEMENT AND PROTECTION BRACES FOR MOUNTING STRUCTURES OF VEHICLE STEERING KNUCKLE LOWER CONTROL ARMS

(71) Applicant: Marlin Crawler, Inc., Fresno, CA (US)

(72) Inventor: Michael Czajkowski, Fresno, CA (US)

(73) Assignee: Marlin Crawler, Inc., Fresno, CA (US)

( * ) Notice: Subject to any disclaimer, the term of this patent is extended or adjusted under 35 U.S.C. 154(b) by 148 days.

(21) Appl. No.: 16/413,525

(22) Filed: May 15, 2019

(65) Prior Publication Data

US 2020/0361265 A1    Nov. 19, 2020

(51) Int. Cl.
*B60G 7/02* (2006.01)
*B62D 17/00* (2006.01)
(Continued)

(52) U.S. Cl.
CPC .................. *B60G 3/06* (2013.01); *B60G 7/02* (2013.01); *B60G 17/00* (2013.01); *B60G 2204/4308* (2013.01); *B60G 2206/911* (2013.01)

(58) Field of Classification Search
CPC ... B60G 3/06; B60G 3/26; B60G 7/02; B60G 2204/143; B60G 2204/40; B60G 2204/42;
(Continued)

(56) References Cited

U.S. PATENT DOCUMENTS 6,446,991 B1 *  9/2002  Klais .................... B60G 7/02
                                              280/124.134
9,902,225 B2 *  2/2018  Riegelsberger ........ B62D 35/02
(Continued)

FOREIGN PATENT DOCUMENTS

DE    102016214423 A1 *  2/2018  ............. B60G 7/001

OTHER PUBLICATIONS

Total Chaos, Lower Control Arm Cam Tab Gussets (2015).
Total Chaos, LCA Cam Tabs Gussets (installation guide) (2015).

*Primary Examiner* — Ruth Ilan
(74) *Attorney, Agent, or Firm* — Sierra IP Law, PC; Mark D. Miller

(57) ABSTRACT

The present invention provides reinforcing braces that may be attached to the factory-supplied chassis mounts for the lower control arms of the steering knuckles of vehicles to reinforce and shield the mounts from objects below the vehicle that may be encountered when traveling through rugged terrain. The braces of the present invention are designed for the front and rear control arm mounts, each brace including a pair of parallel sturdy metal flanges that are generally perpendicularly attached to a sturdy metal lower base plate. Each flange is designed to be attached to one of the parallel flanges of the factory-supplied chassis mounts, and has a generally U-shaped opening therein for receiving mounting hardware and strengthening of the camber adjustment tabs. The sturdy metal lower base plates may extend out and away from the flanges of the brackets to provide a lower shield to protect the chassis and mounting hardware from damage that may occur from contact with large objects that may be encountered below the vehicle. The front base plate may include an elongated section that extends toward the front of the vehicle to provide a shield for deflecting large objects as the vehicle moves forward.

12 Claims, 32 Drawing Sheets

(51) Int. Cl.
*B60G 3/06* (2006.01)
*B60G 17/00* (2006.01)

(58) Field of Classification Search
CPC .... B60G 2204/4302; B60G 2204/4308; B60G 2204/61; B60G 2206/911; B62D 17/00
See application file for complete search history.

(56) References Cited

U.S. PATENT DOCUMENTS

| | | | |
|---|---|---|---|
| 10,808,792 B2 * | 10/2020 | Schroeder | B60G 7/005 |
| 10,864,790 B2 * | 12/2020 | Behn | B60G 7/02 |
| 2016/0121676 A1 * | 5/2016 | Drabon | B60G 7/02 |
| | | | 280/124.125 |
| 2019/0263207 A1 * | 8/2019 | Krolo | B21D 28/32 |
| 2020/0062060 A1 * | 2/2020 | Chevalier | B62D 29/008 |

* cited by examiner

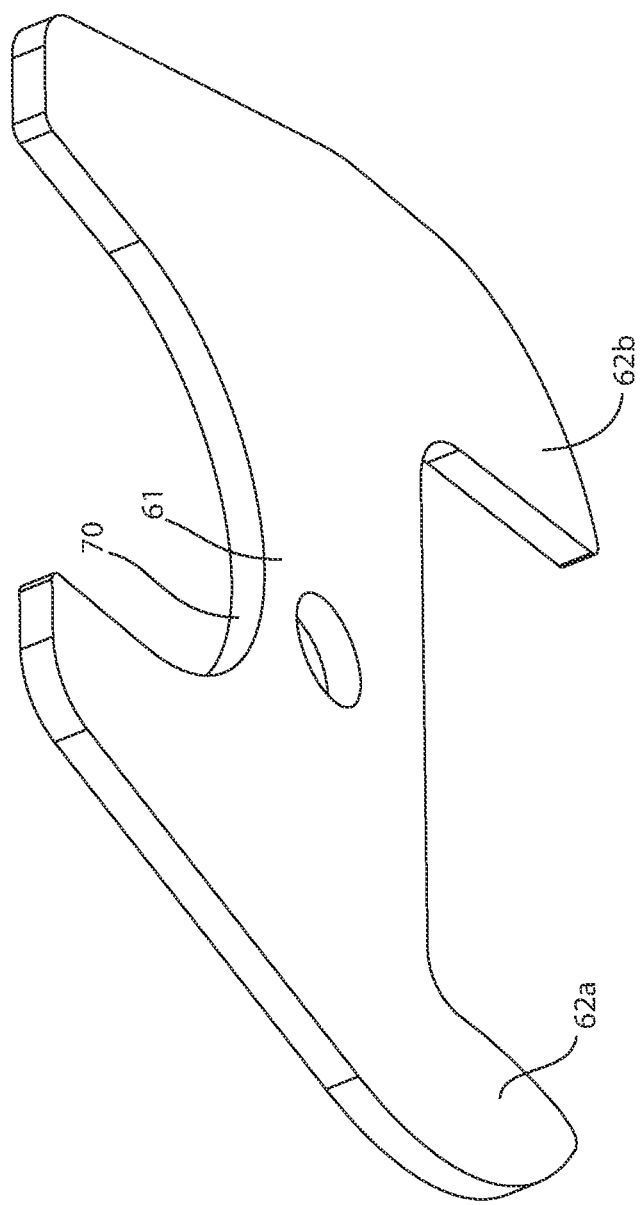

REINFORCEMENT AND PROTECTION BRACES FOR MOUNTING STRUCTURES OF VEHICLE STEERING KNUCKLE LOWER CONTROL ARMS

BACKGROUND OF THE INVENTION

1. Field of the Invention

The present invention relates to steering knuckles, and more particularly to braces for reinforcement and protection of mounting structures used to attach the lower control arm of a vehicle steering knuckle to the chassis of a vehicle that are capable of withstanding significant force, and are capable of deflecting objects (such as rocks) away from the lower control arm while the vehicle is in motion to avoid damage to the steering assembly or loss of camber, and related methods.

2. Description of the Prior Art

A typical steering knuckle (or spindle) is a component of the front suspension of a vehicle, which attaches the wheel and brake assemblies to the vehicle, and allows the wheels to travel vertically, turn, and rotate. A steering assembly allows an operator of the vehicle to move the steering knuckles in order to steer the vehicle. A steering knuckle is ordinarily pivotally attached to an upper control arm, and to a lower control arm of the vehicle steering assembly. One end of each control arm is pivotally attached to the steering knuckle, and opposite ends of each control arm are pivotally attached to the vehicle chassis. Because of its location, the lower control arm and its mounting structures may be directly exposed to objects below the vehicle. As a result of this exposure, objects coming into contact with the lower control arm or its mounting structures may cause the lower control arm or its mounting structures to bend or break which may affect the steering of the vehicle.

Many sport vehicles are used for rock crawling which is a form of off-road driving in which a vehicle is driven through harsh terrain and may encounter steep grades, boulders, rock piles and other obstacles. In many cases, the factory-supplied vehicle steering knuckles and control arms are removed and replaced with heavy-duty steering knuckles and control arms that are better suited for rock crawling. While these after-market parts may be designed to withstand the added forces encountered in rock crawling, the factory mounts for attaching the lower control arm to the chassis are generally not so sturdy.

A typical factory-supplied chassis mount for a lower control arm includes a front and a rear mounting structure. Each of these structures typically includes a pair of generally parallel flanges having oval-shaped openings therein for receiving bolts or other devices for attachment to a corresponding mating structure on the lower control arm. These pairs of flanges are generally directly exposed to objects underneath the vehicle. As a result, the boulders, rocks, tree trunks or other large obstacles encountered by a vehicle in the environment of rock crawling can wreak havoc on these factory-supplied mounting structures for the lower control arms by deforming, bending or breaking these structures, leading to loss of camber, alignment problems, steering malfunctions and steering failures.

Additional sport vehicle uses include desert and sand dune driving which may involve the vehicle traveling at high speed over uneven terrain with the possibility of airborne travel (jumping) as well as high speed travel through mud and snow. Vehicles in these environments may encounter sudden impact with unseen objects covered by sand, mud or snow. Using a vehicle in this manner also imposes significant loads to the factory-supplied lower control arm mounts and associated hardware.

The factory-supplied flanges include camber plates with oval-shaped openings for receiving mounting bolts and other hardware. The openings are oval-shaped in order to allow for adjustments of camber to be made for alignment purposes. Camber adjustment tabs are provided on the camber plates on either side of these oval-shaped openings to help hold the adjustment bolts and other hardware mounted in the openings in place. Unfortunately, because of the oval shape of these openings, jolts or other significant forces encountered by the wheels of the vehicle are transmitted directly to this hardware such that even if the bolts and other hardware are tightly mounted, the tabs cannot prevent this hardware from moving in the oval-shaped openings. This movement can cause the tabs to be bent or deformed, throwing the wheel out of alignment, which can lead to uneven tire wear and other related problems. One solution to this situation calls for the complete removal of the camber plates and tabs, and replacement with after-market plates with thicker tabs to help prevent movement in the oval-shaped openings. Unfortunately, this requires removal and replacement of eight camber plate and drilling of 24 welded attachments Not only is this difficult and time consuming, but there is a great potential for improper positioning of the new plates; and the only benefit afforded is only slightly stronger camber plate tabs.

It is therefore desirable to provide reinforcement and protection for the mounting structures of the lower control arms of vehicle steering knuckles that are capable of withstanding contact with rocks, boulders and other objects and forces encountered in rock crawling and other recreational activities in order to avoid damaging these mounts or affecting the steering of the vehicle.

SUMMARY OF THE INVENTION

Embodiments of the present invention provide reinforcing braces that may be attached to the factory-supplied chassis mounts for the lower control arms of the steering knuckles of a vehicle. Embodiments of the braces of the present invention are designed for the front and rear lower control arm mounts, each brace including a pair of parallel sturdy metal flanges that are generally perpendicularly attached to a sturdy metal lower base plate. Each flange is designed to be attached to one of the parallel flanges of the factory-supplied chassis mounts. Each flange has a generally U-shaped opening therein for receiving mounting hardware, with the openings including slotted areas adjacent to the camber plate tabs to provide reinforcement to these tabs. In embodiments of the invention, the lower plate may extend out and away from one or both of the sturdy flanges. The sturdy parallel flanges provide reinforcement to the factory-supplied chassis mounting flanges and the camber plate tabs, and the lower base plate and optional extensions provide a deflecting shield that protects the chassis mounting flanges and mounting hardware from damage that may occur from contact with large objects that may be encountered below the vehicle.

In embodiments of the invention, a front brace for a chassis mount for a lower control arm of a steering knuckle may include a front bracket comprising two parallel flanges having openings therein for receiving mounting hardware and camber plate tabs, in which the parallel flanges of the bracket are welded to the existing parallel flanges of the factory-supplied front mount for reinforcement of the factory flanges and camber plate tabs. It is to be appreciated that in different embodiments of the invention, the size and shape of the flanges may be modified to accommodate the installation of after-market camber plates and tabs. The front bracket should preferably be made of iron, steel or other sturdy metal, and the thickness of the flanges of the bracket should be at least the same as and preferably greater than the thickness of the factory-supplied front flanges. For example, and without limitation, the factory flanges may have a thickness of approximately 3 mm, and embodiments of the present invention may be made of steel and may have a thickness of approximately ¼ inch (6.25 mm) providing a total thickness of over 9 mm at the flanges. The positions of the openings in the flanges of the bracket should correspond to the positions of the corresponding openings on the factory-supplied flanges so that the same or similar mounting hardware may be used to attach the front mount of the lower control arm to the reinforced flanges. The lower base plate of the front bracket extends between and is generally perpendicularly to the parallel flanges of the bracket, and is made of metal having at least the same (e.g. ¼ inch) or potentially greater thickness as the flanges. Edges of the lower base plate may also be welded to the chassis.

In some embodiments of the front bracket, a first extension may be provided on the lower base plate of the front bracket that extends out and away from the flanges toward the front of the vehicle. This extension is designed and positioned to be able to receive the first impact of an object (such as a boulder or tree stump) below the vehicle as it moves forward through rugged terrain. Because the extension is part of the base plate and made of sturdy metal, and because it is attached to the sturdy reinforcing flanges of the front bracket, it can withstand significant force without allowing damage to the chassis mounting structure or hardware for the front mount of the lower control arm.

In embodiments of the invention, one or more further extensions may be provided on the lower base portion of the front bracket extending toward the rear and/or center of the vehicle. These additional extensions, together with the front extension and lower base plate itself, provide a shield for the chassis mounting structure for the front mount of the lower control arm.

In embodiments of the invention, a rear brace may also be provided for a chassis mount for a lower control arm of a steering knuckle which may include a rear bracket comprising two parallel flanges having openings therein for receiving mounting hardware and camber plate tabs in which the parallel flanges of the bracket are welded to the existing parallel flanges of the factory-supplied rear mount for reinforcement of the factory flanges and camber plate tabs. It is to be appreciated that in different embodiments of the invention, the size and shape of the flanges may be modified to accommodate the installation of after-market camber plates and tabs. The rear bracket should preferably be made of iron, steel or other sturdy metal, and the thickness of the flanges of the bracket should be at least the same as and preferably greater than the thickness of the factory-supplied rear flanges. For example, and without limitation, the factory flanges may have a thickness of approximately 3 mm, and embodiments of the present invention may be made of steel and may have a thickness of approximately ¼ inch (6.25 mm) providing a total thickness of over 9 mm at the flanges. The positions of the openings in the flanges of the bracket should correspond to the positions of the corresponding openings on the factory-supplied flanges so that the same or similar mounting hardware may be used to attach the rear mount of the lower control arm to the reinforced flanges. The lower base plate of the rear bracket extends between and is generally perpendicularly to the parallel flanges of the bracket, and is made of metal having at least the same (e.g. ¼ inch) or potentially greater thickness as the rear flanges. Edges of the rear lower base plate may also be welded to the chassis.

In embodiments of the rear bracket, the lower base plate may extend a short distance out and away from both sides of the factory mounting flanges to provide protection from impacts with objects below the vehicle (such as a boulder or tree stump) as it moves through rugged terrain. Because the base is made of sturdy metal, and because is attached to the sturdy reinforcing flanges of the rear bracket, it can withstand significant force without allowing damage to the chassis mounting structure or hardware for the rear mount of the lower control arm.

In embodiments of both front and rear parallel brackets, the factory-supplied camber adjustment tabs, or after-market camber adjustment tabs if they are installed, are reinforced resulting in a significant strength increase to resist deformation to the adjustment tabs which may lead to a loss of suspension or steering alignment.

It is therefore an object of the present invention to provide methods and apparatus for reinforcing the front and rear factory-supplied chassis mounts for the lower control arms of the steering knuckles of a vehicle.

It is also an object of the present invention to provide methods and apparatus for protecting and deflecting objects away from the front and rear factory-supplied chassis mounts for the lower control arms of the steering knuckles of a vehicle.

It is also an object of the present invention to provide sturdy brackets and mounting hardware for reinforcing and protecting the front and rear factory-supplied chassis mounts for the lower control arms of the steering knuckles of a vehicle.

It is also an object of the present invention to provide methods for installing sturdy brackets and mounting hardware for reinforcing and protecting the front and rear factory-supplied chassis mounts for the lower control arms of the steering knuckles of a vehicle.

It is also an object of the present invention to provide increased strength and rigidity to the camber adjustment tabs of front and rear chassis mounts.

Other objects of the invention will be apparent from the detailed descriptions and the claims herein.

BRIEF DESCRIPTION OF THE DRAWINGS

FIG. 32 is a bottom perspective view of an embodiment of a rear base plate of the present invention.

DETAILED DESCRIPTION

Figure 1:
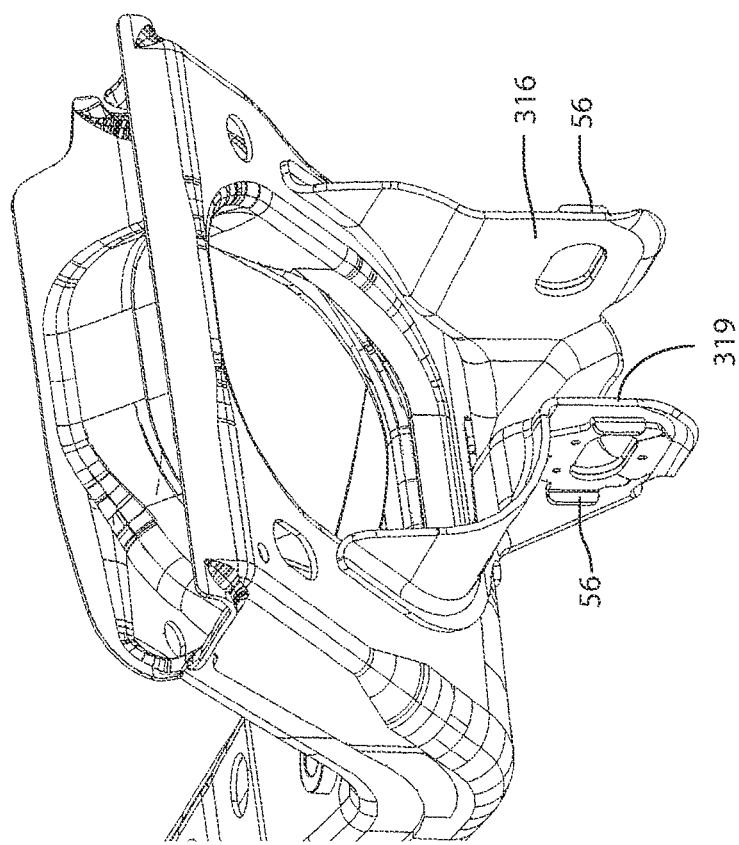
FIG. 1 is a perspective environmental view of an exemplary passenger side front factory mount for a lower control arm of a steering knuckle illustrating a pair of mounting flanges.
Figure 2:
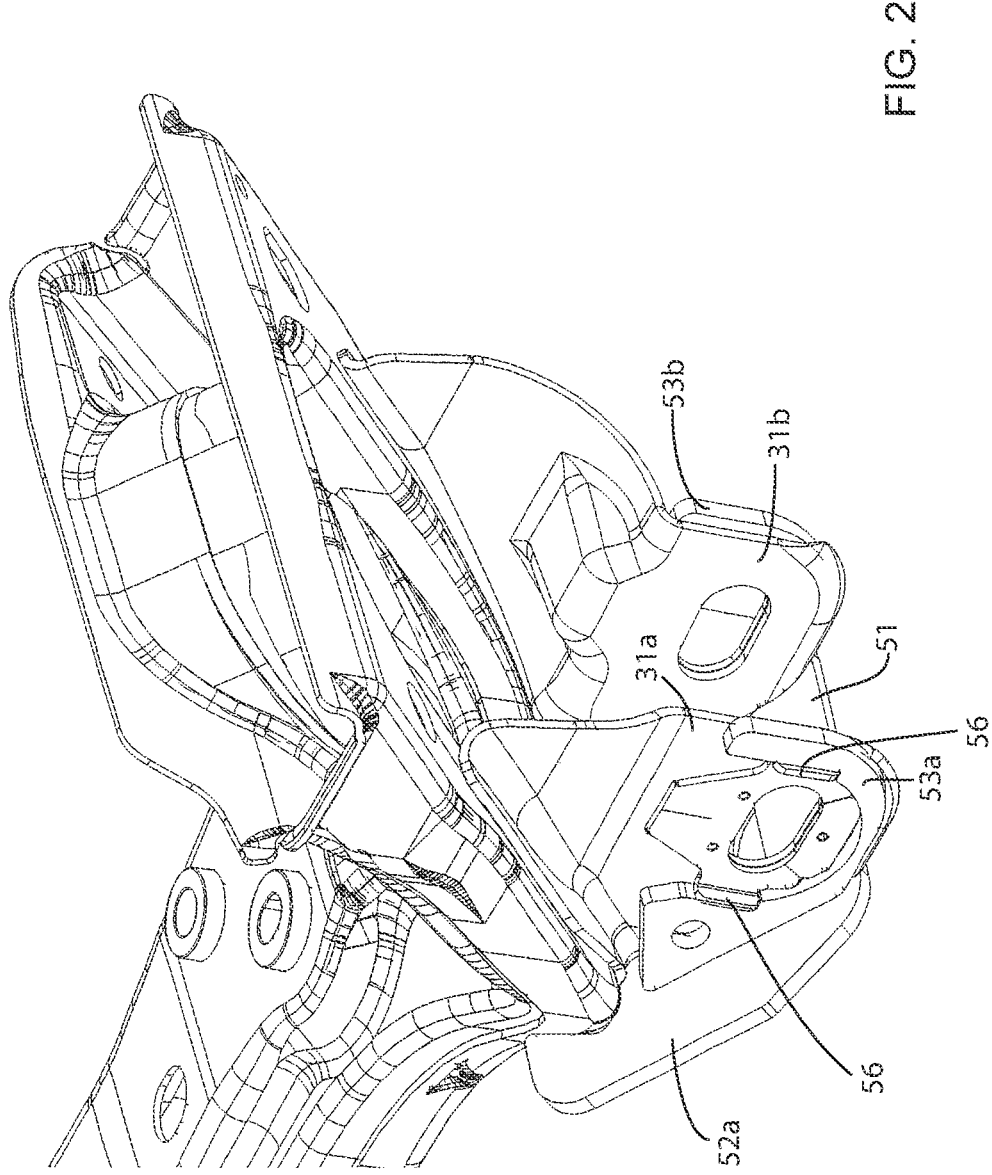
FIG. 2 is a perspective view of an embodiment of the present invention installed on a passenger side front factory mount for a lower control arm of a steering knuckle, without any mounting hardware.
Figure 3:
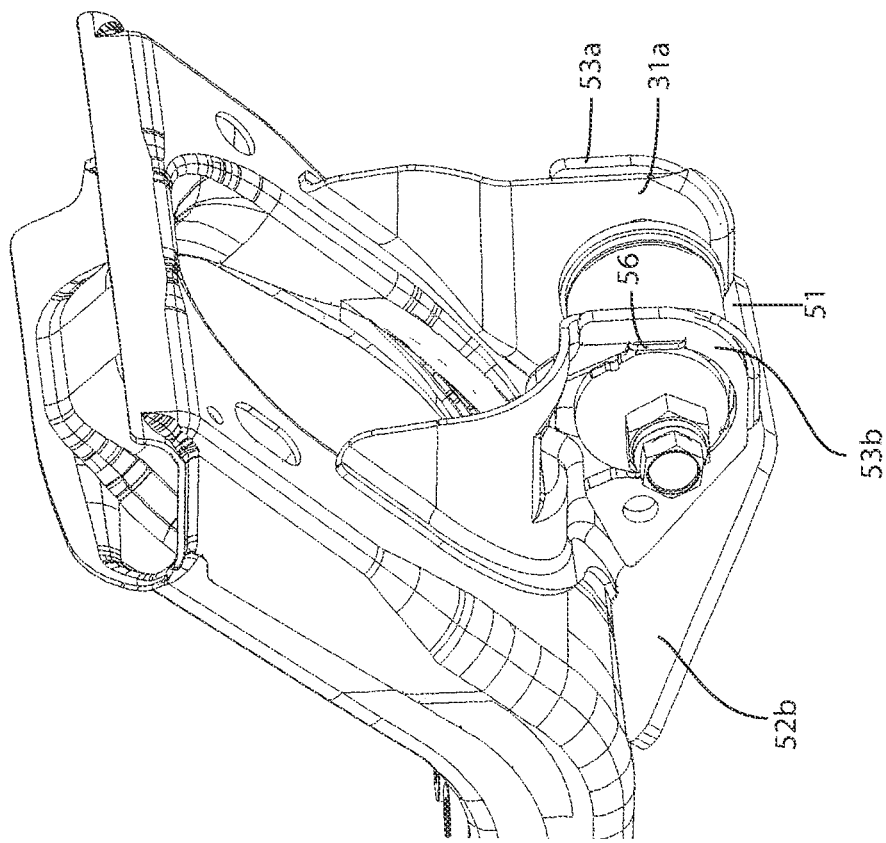
FIG. 3 is an upper perspective view of an embodiment of the present invention installed on a driver side front factory mount for a lower control arm of a steering knuckle with mounting hardware.
Figure 4:
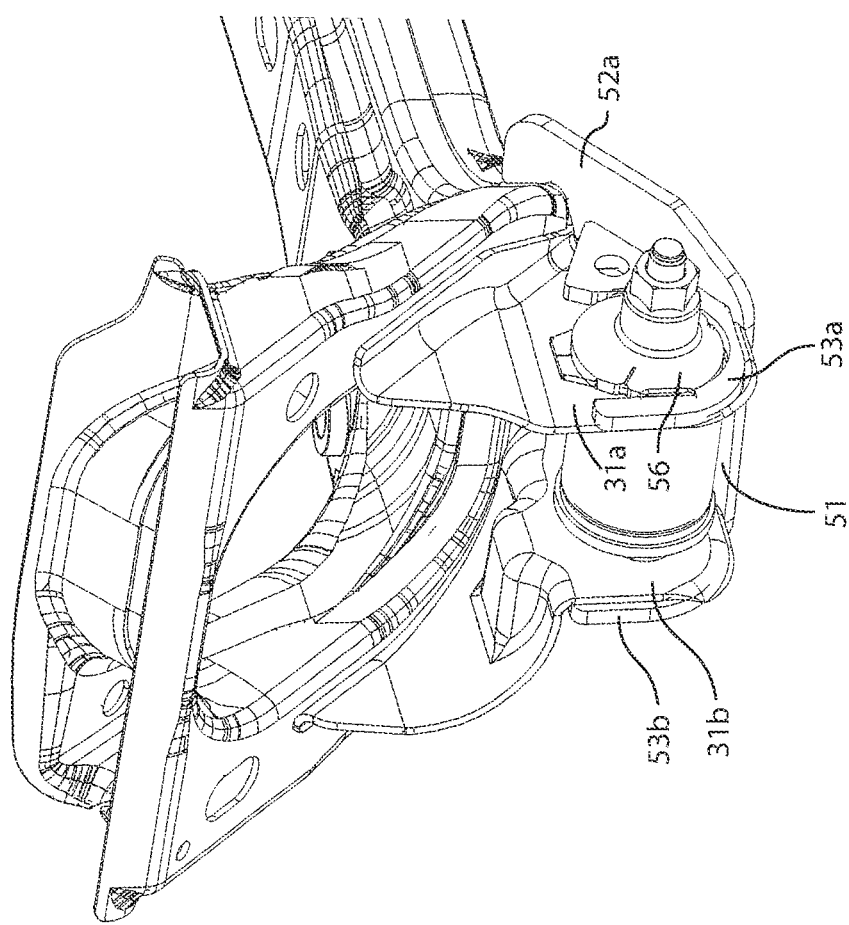
FIG. 4 is another upper perspective view of an embodiment of the present invention installed on a driver side front factory mount for a lower control arm of a steering knuckle with mounting hardware.
Figure 5:
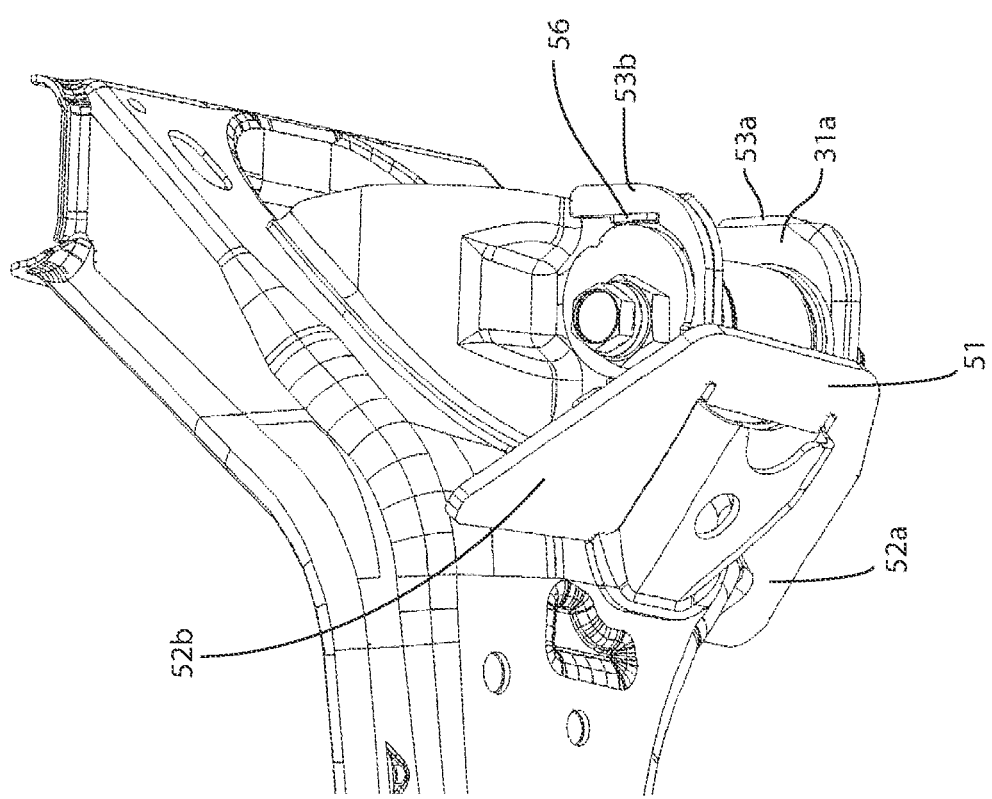
FIG. 5 is a lower perspective view of an embodiment of the present invention installed on a driver side front factory mount for a lower control arm of a steering knuckle with mounting hardware.
Figure 6:
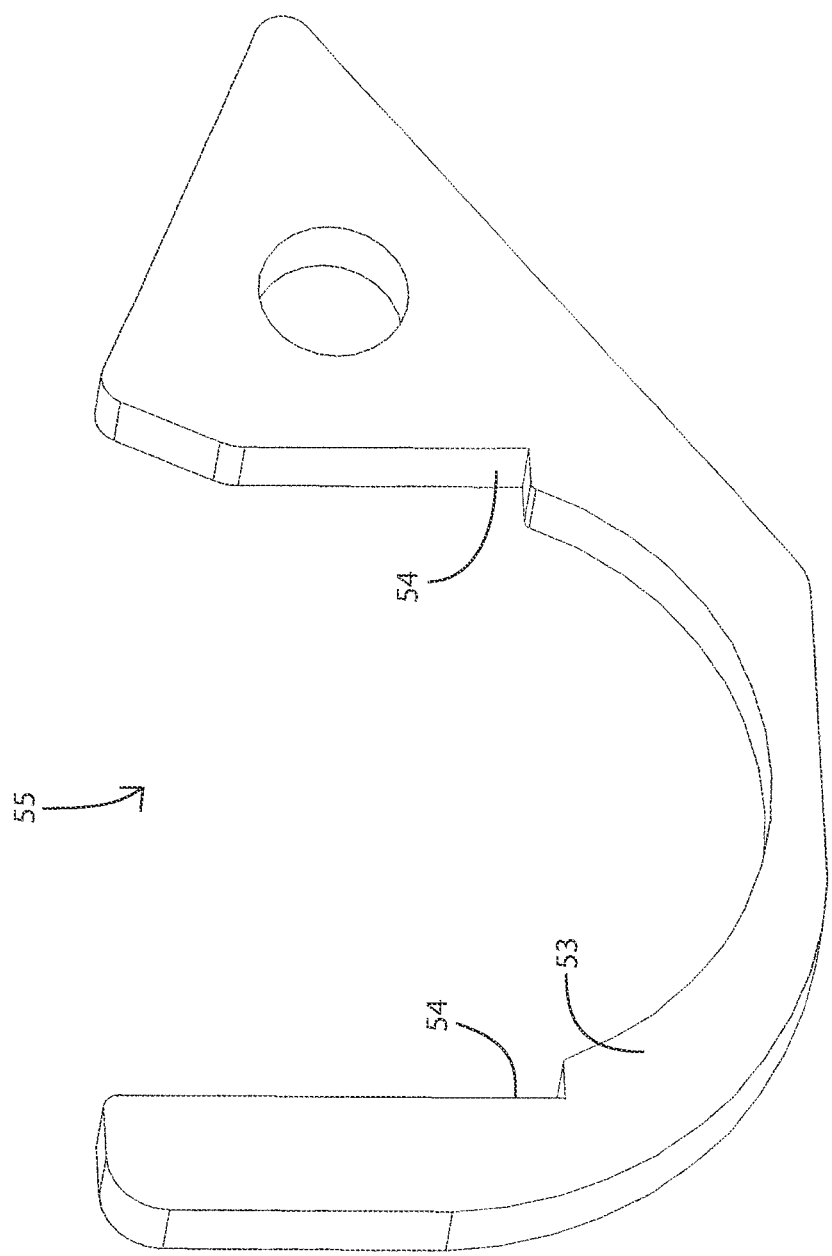
FIG. 6 is a side perspective view of an embodiment of a front reinforcing flange of the present invention.
Figure 7:
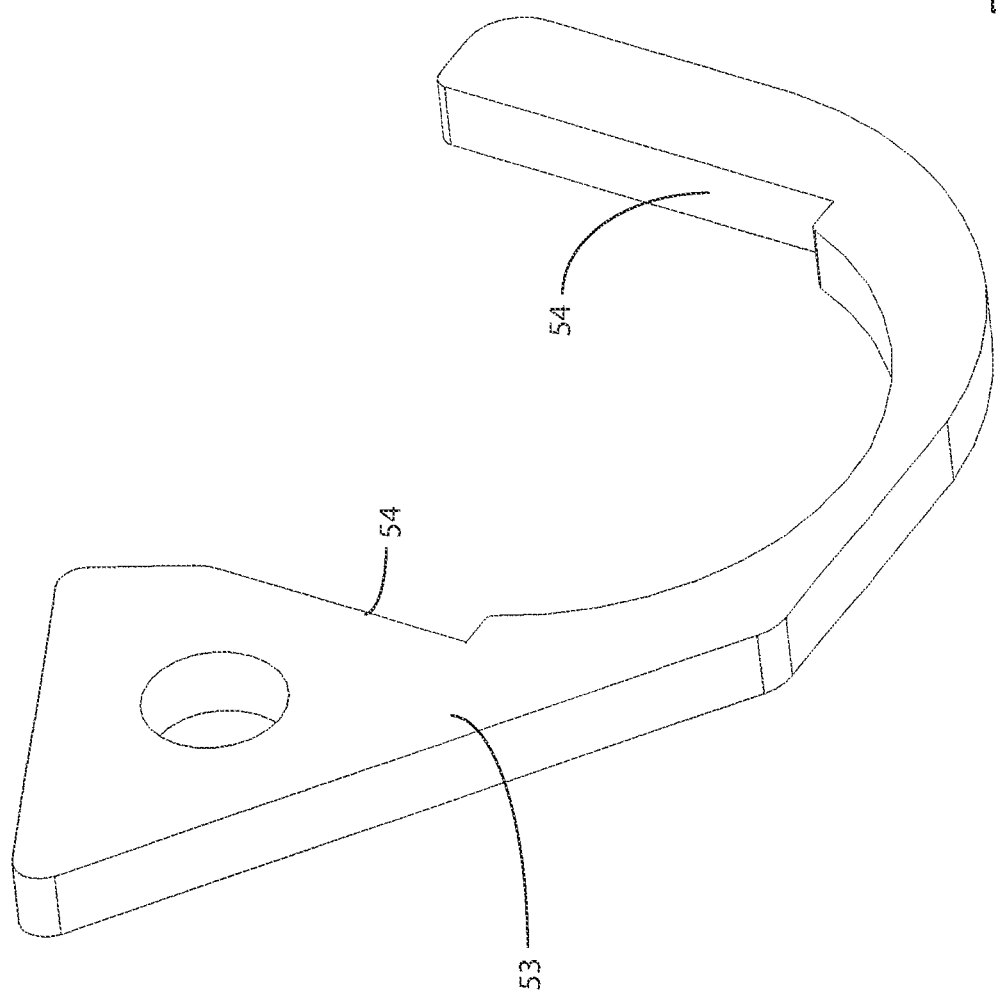
FIG. 7 is an opposite side perspective view of an embodiment of a front reinforcing flange of the present invention.
Figure 8:
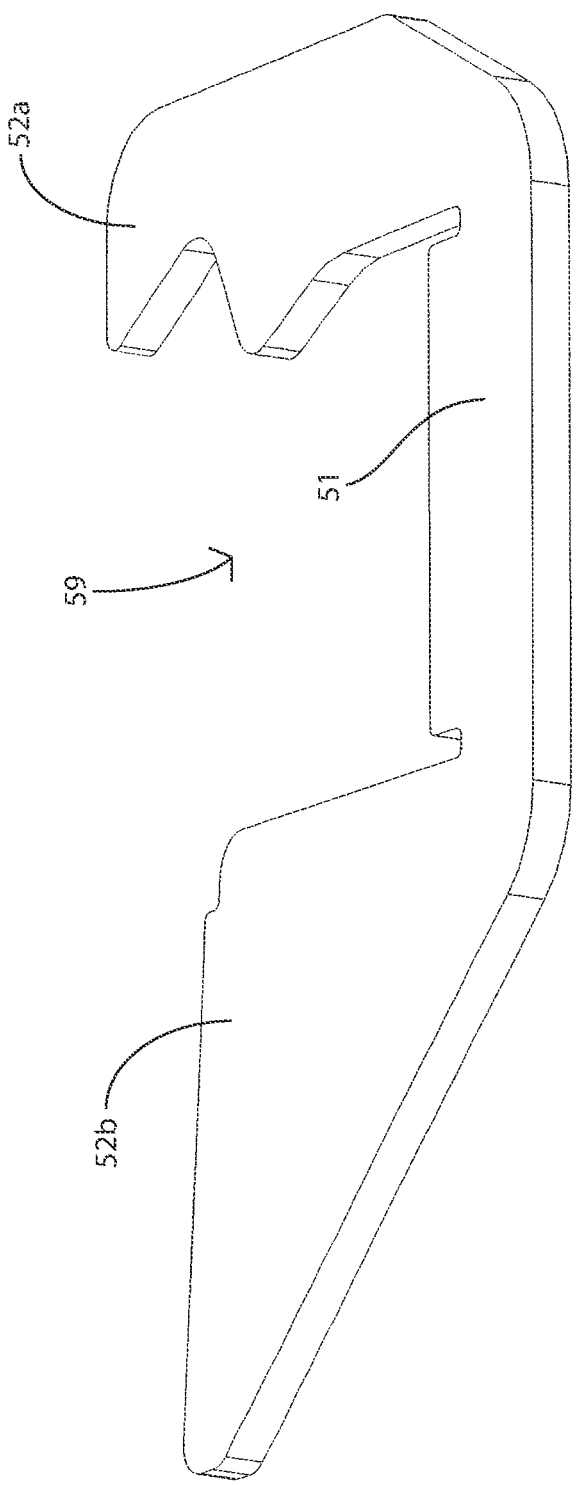
FIG. 8 is a top perspective view of an embodiment of a front base plate of the present invention.
Figure 9:
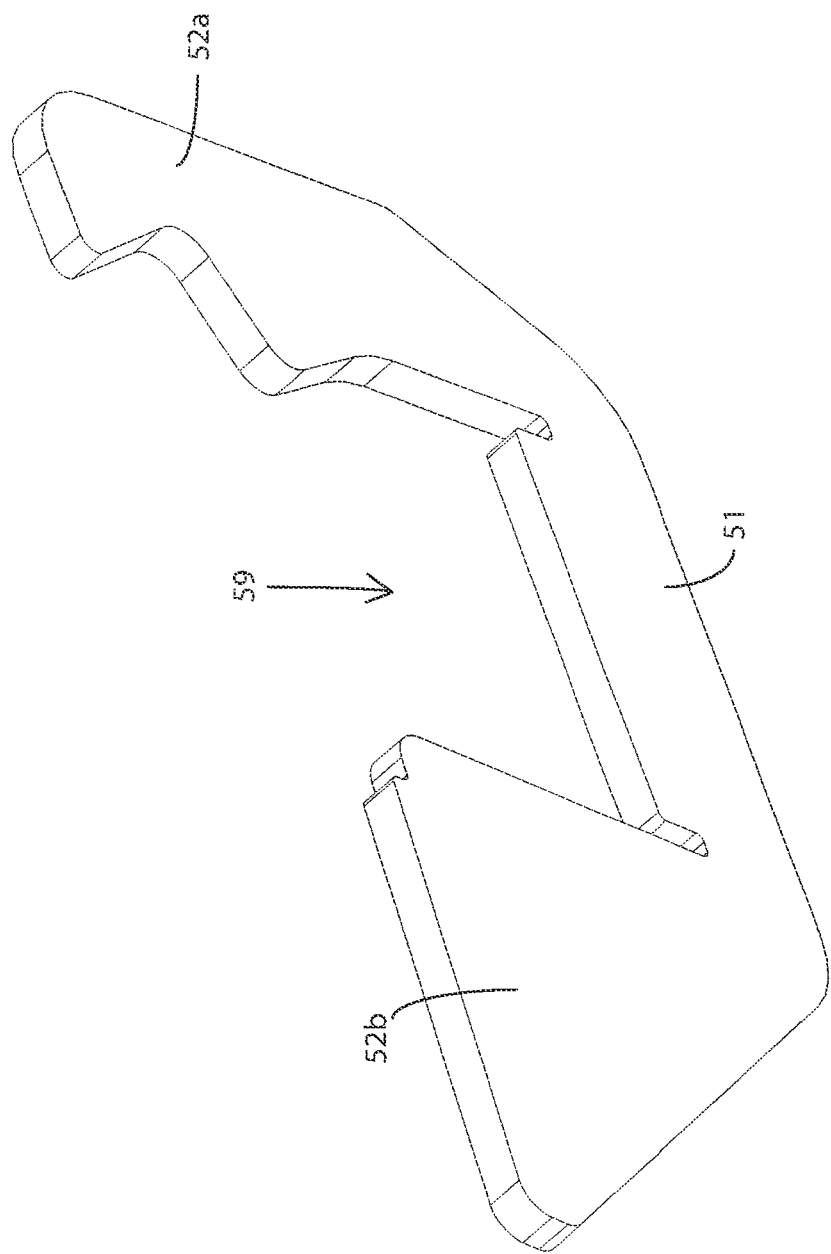
FIG. 9 is a bottom perspective view of an embodiment of a front base plate of the present invention.
Figure 10:
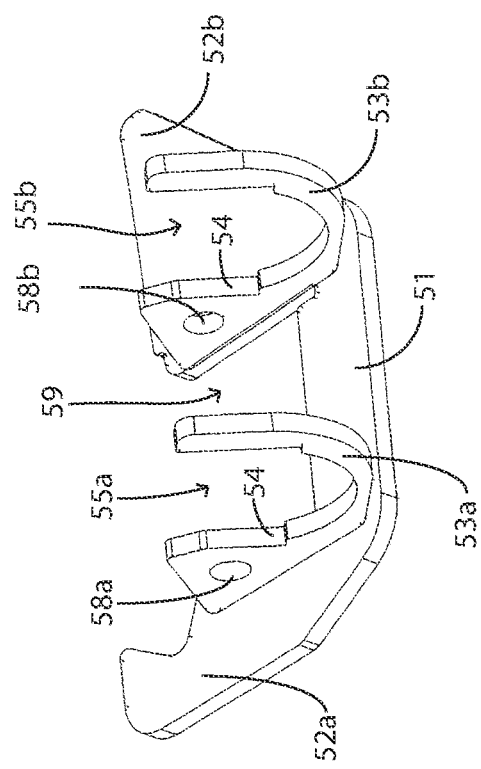
FIG. 10 is a top perspective view of an embodiment of a front bracket of the present invention.
Figure 11:
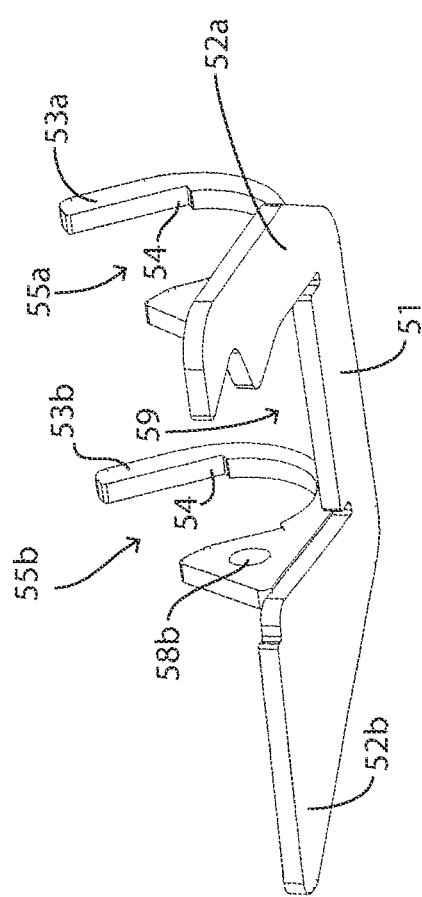
FIG. 11 is a lower perspective view of the embodiment of the bracket of FIG. 10.
Figure 12:
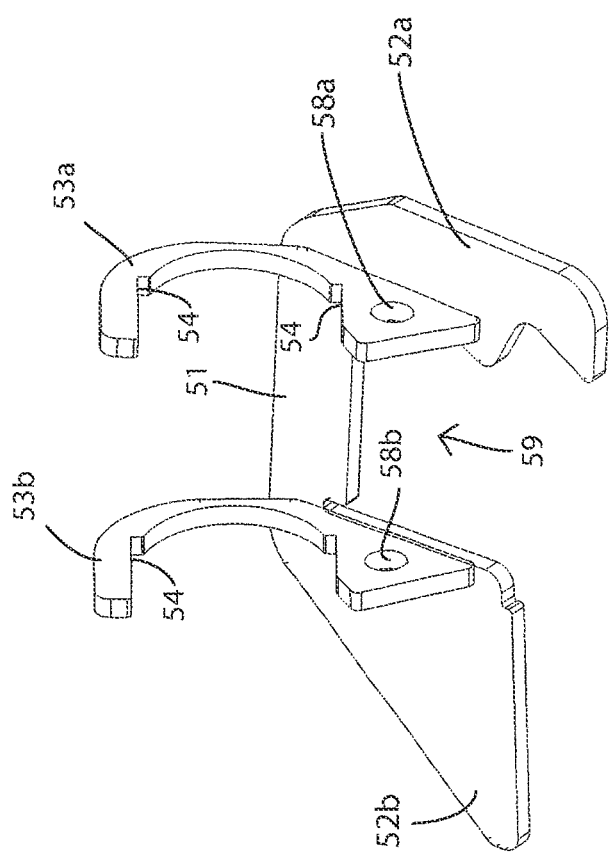
FIG. 12 is another top perspective view of the embodiment of the bracket of FIG. 10.
Figure 13:
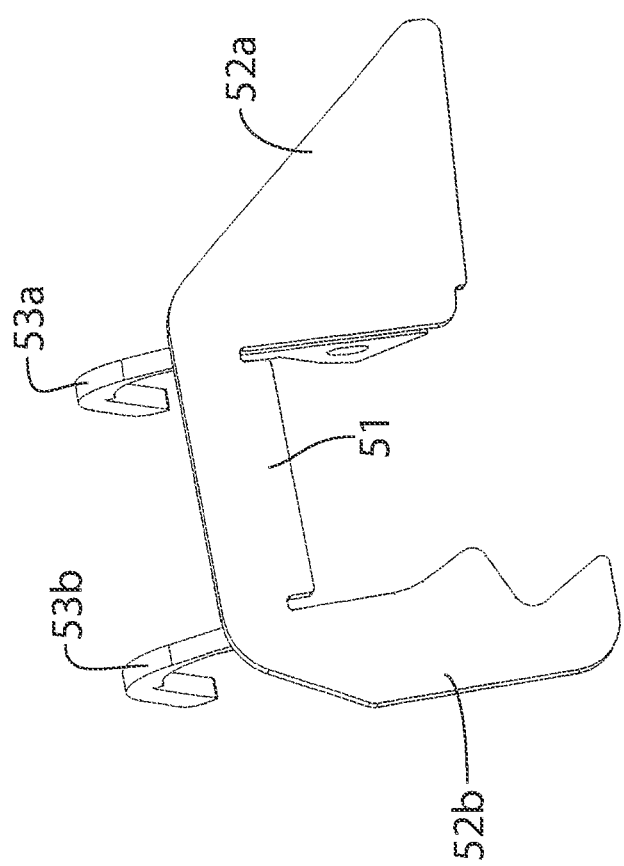
FIG. 13 is another lower perspective view of the embodiment of the bracket of FIG. 10.
Figure 14:
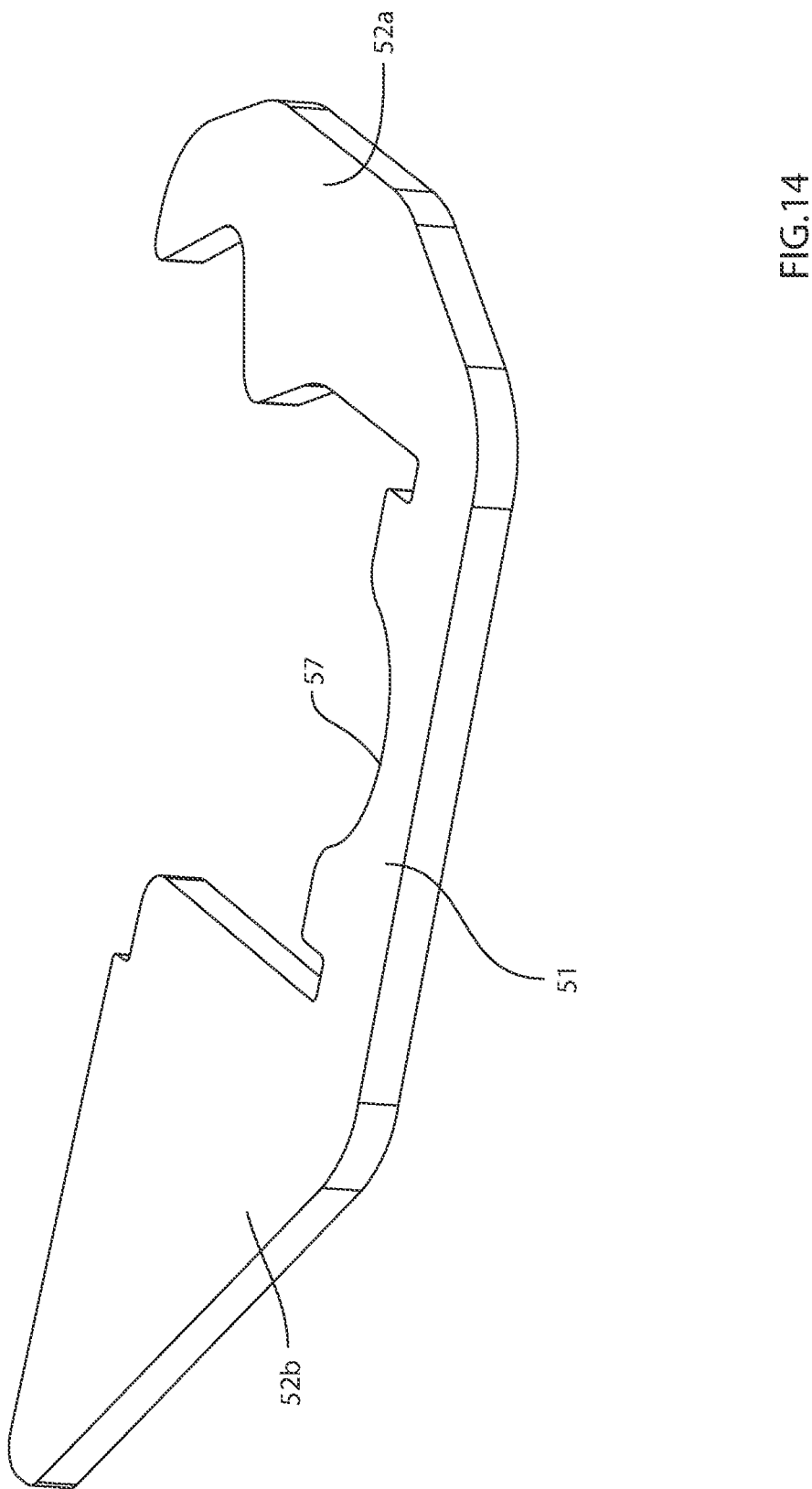
FIG. 14 is a top perspective view of another embodiment of a front base plate of the present invention.
Figure 15:
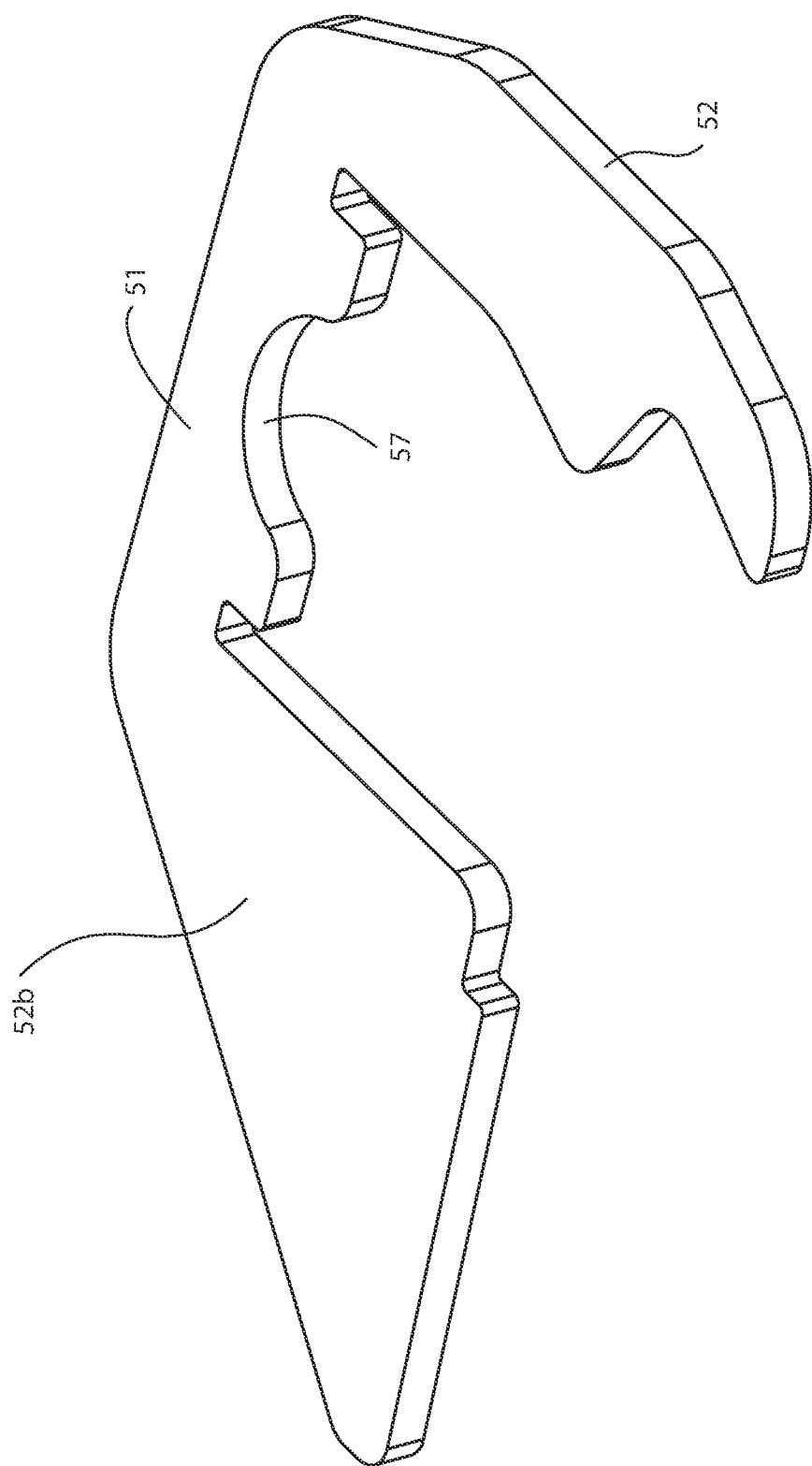
FIG. 15 is a bottom perspective view of another embodiment of a front base plate of the present invention.

Referring to the drawings wherein like reference characters designate like or corresponding parts throughout the several views, and referring particularly to FIGS. 10-13, it is seen that the illustrated embodiment of a passenger-side front bracket of the invention includes a base plate 51 and a pair of parallel generally U-shaped flanges or cams 53a, 53b that are perpendicularly attached to base plate 51. Flanges 53a, 53b provide reinforcement to the factory front flanges 31a, 31b, and base plate 51 provides a lower shield for these flanges and related hardware against objects below the vehicle. Flanges 53a, 53b each include a slotted section 54 for engagement against a camber tab 56 of a vehicle camber plate. It is to be appreciated that in different embodiments of the invention, the size and shape of slotted sections 54 may be modified to accommodate the different size and shape of after-market camber plates and tabs 56 if these have been installed.

Front base plate 51 may include front and rear extensions 52a, 52b. In the illustrated embodiment of FIGS. 10-13, front base plate extension 52b is elongated in order to provide a front shield against incoming objects (boulders, tree trunks, etc.) that may be encountered underneath the vehicle as it travels forward. Base plate 51, flanges 53a, 53b and extensions 52a, 52b should all preferably be made of sturdy metal in order to provide reinforcement and shielding to the factory mounts and cam tabs for the lower control arm of the steering knuckle. Openings 55a, 55b are provided in flanges 53a, 53b for receiving hardware for mounting the front lower control arm to the chassis of the vehicle. An opening 59 is provided in base 51 to provide room for structures related to the vehicle wheel support. Holes 58a and 58b may be provided in each flange 53a, 53b to provide additional locations for welding the flanges to the vehicle chassis. It is to be appreciated that although the views of FIGS. 10-13 illustrate embodiments for use on the passenger side of a vehicle, that mirror-images of these illustrated embodiments may be provided for the driver side of a vehicle.

Figure 16:
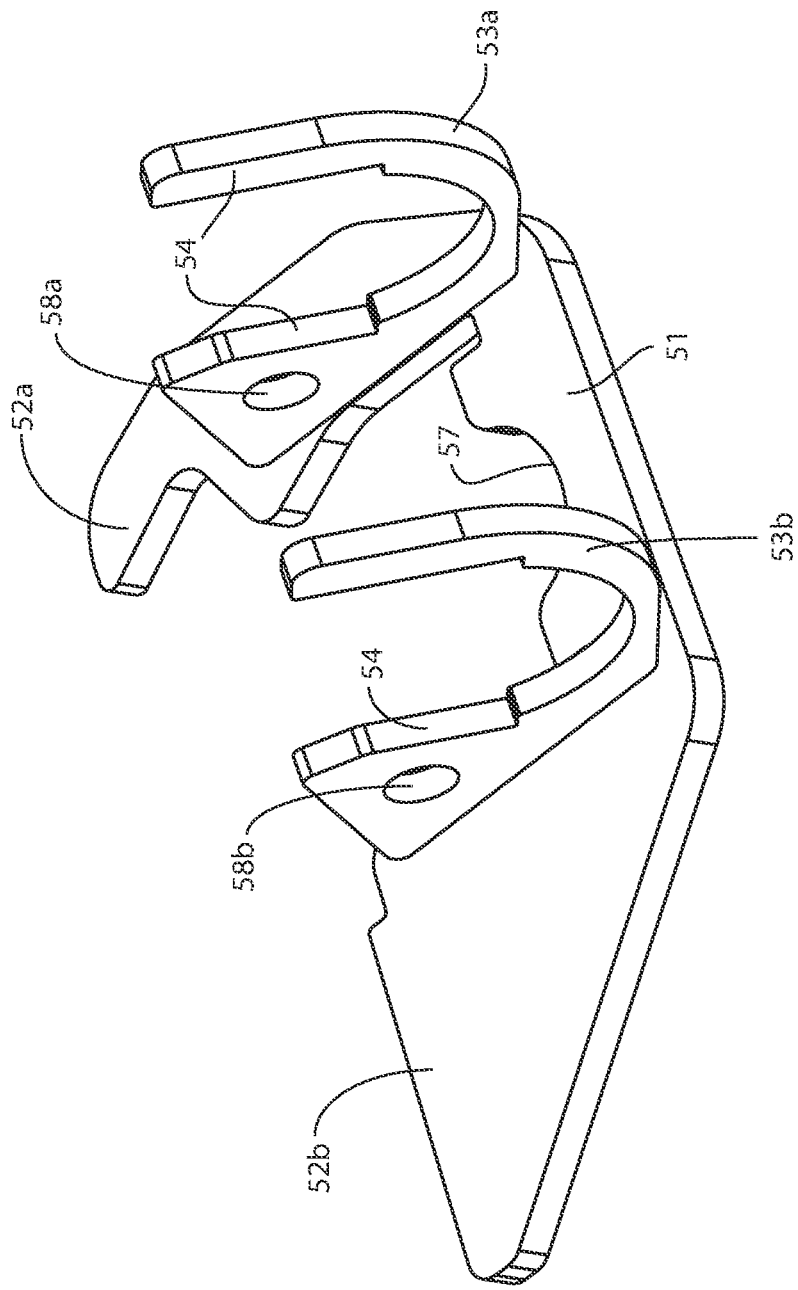
FIG. 16 is a top perspective view of another embodiment of a front bracket of the present invention.
Figure 17:
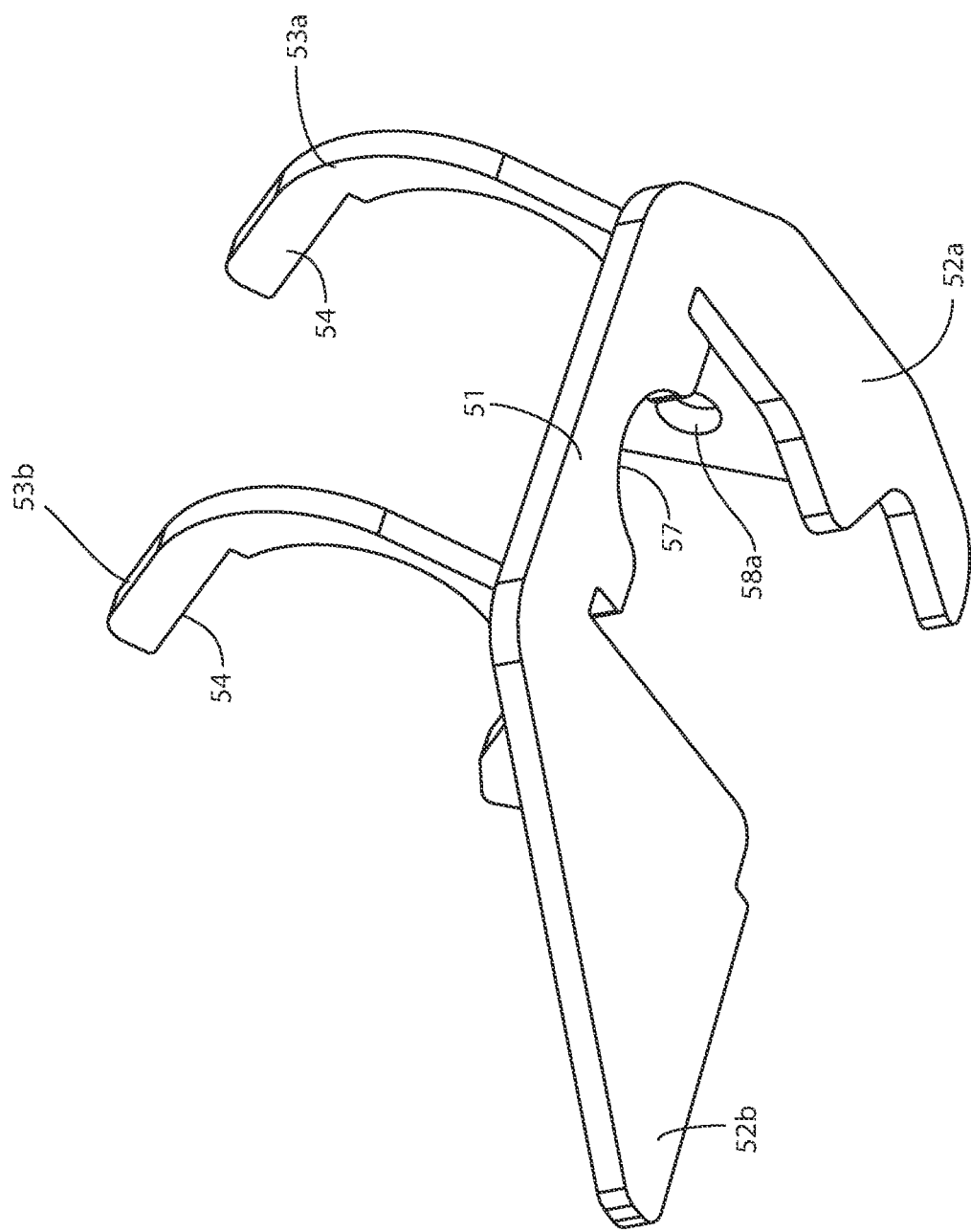
FIG. 17 is a lower perspective view of the embodiment of the bracket of FIG. 16.
Figure 18:
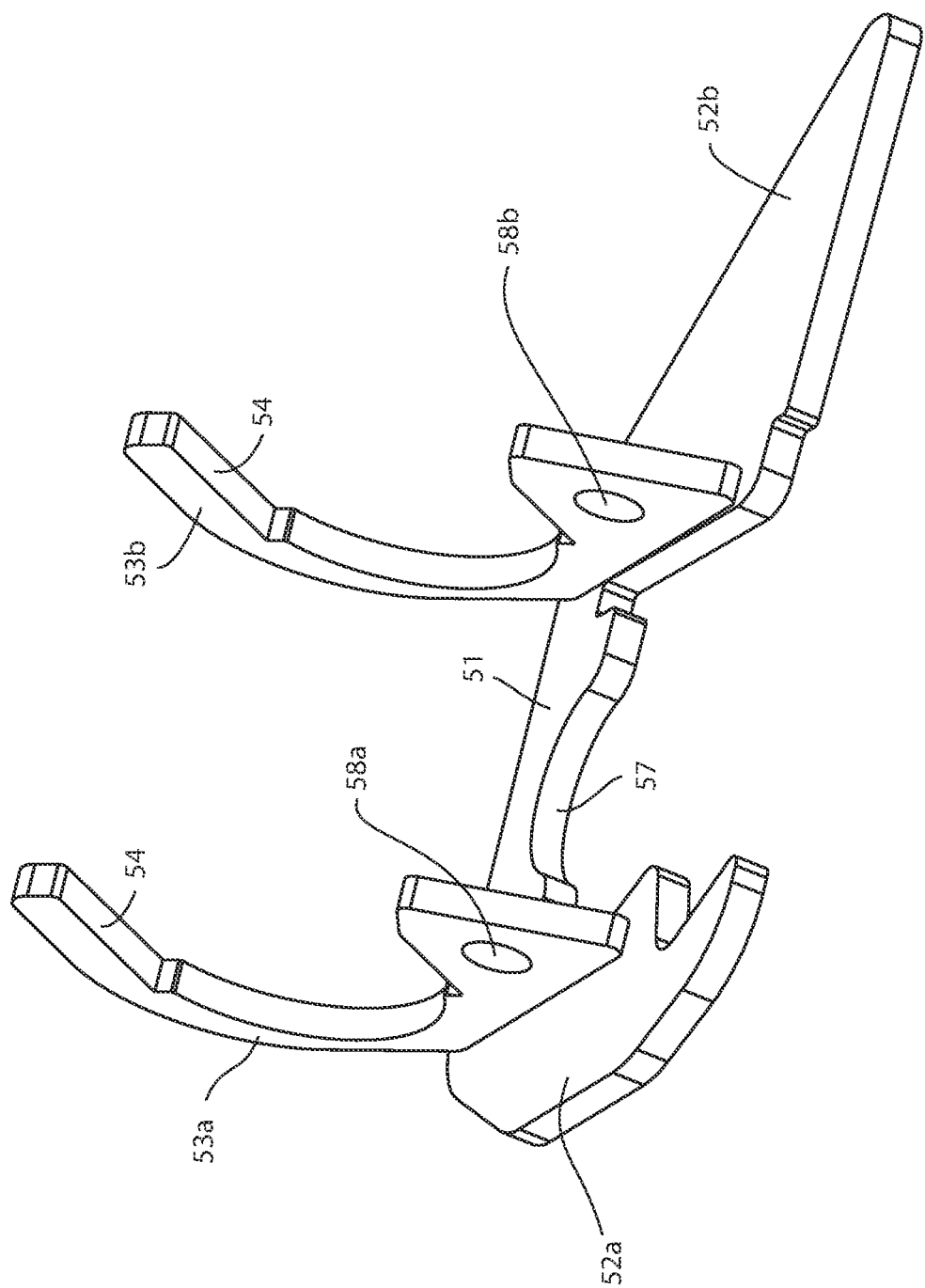
FIG. 18 is another top perspective view of the embodiment of the bracket of FIG. 16.
Figure 19:
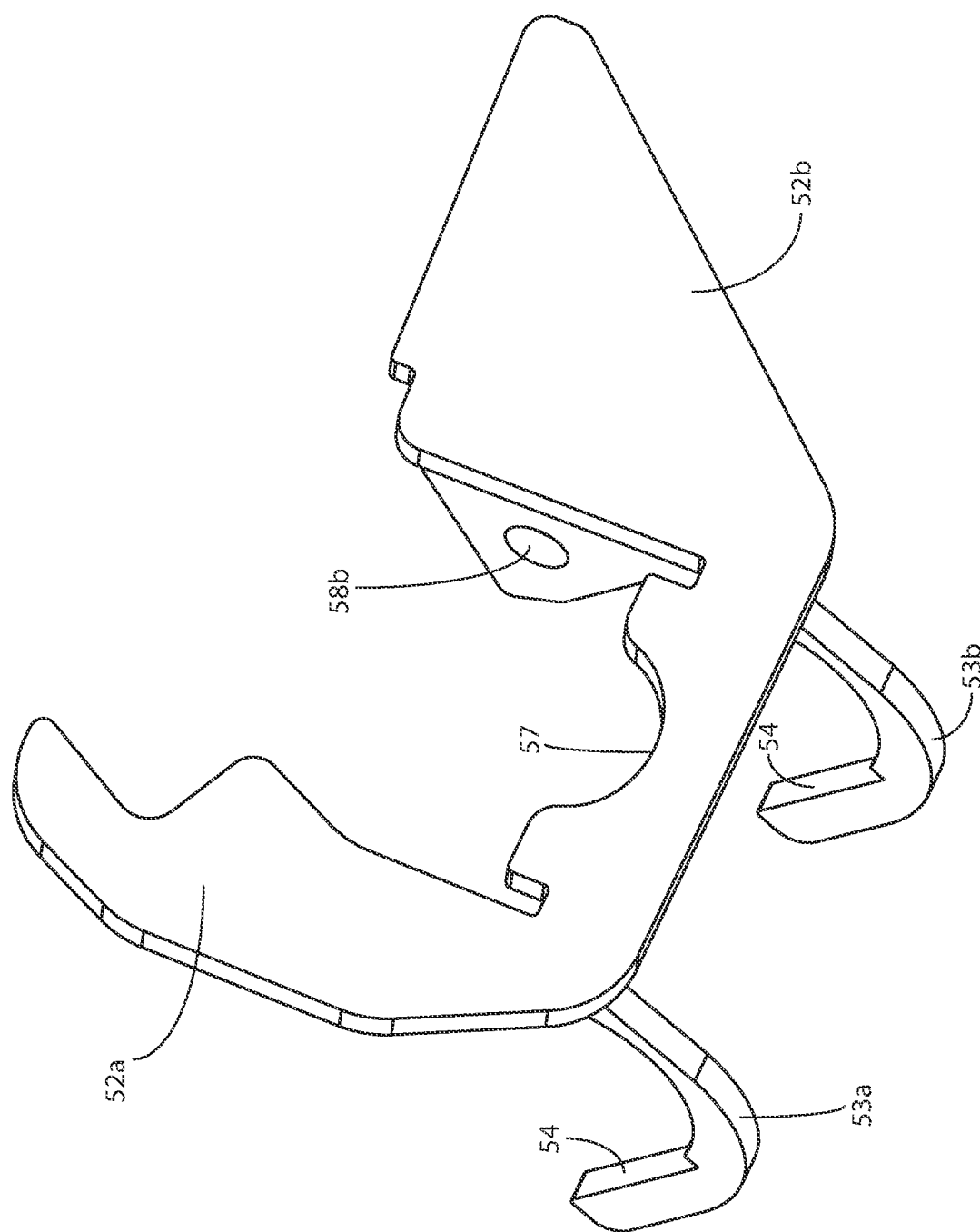
FIG. 19 is another lower perspective view of the embodiment of the bracket of FIG. 16.
Figure 20:
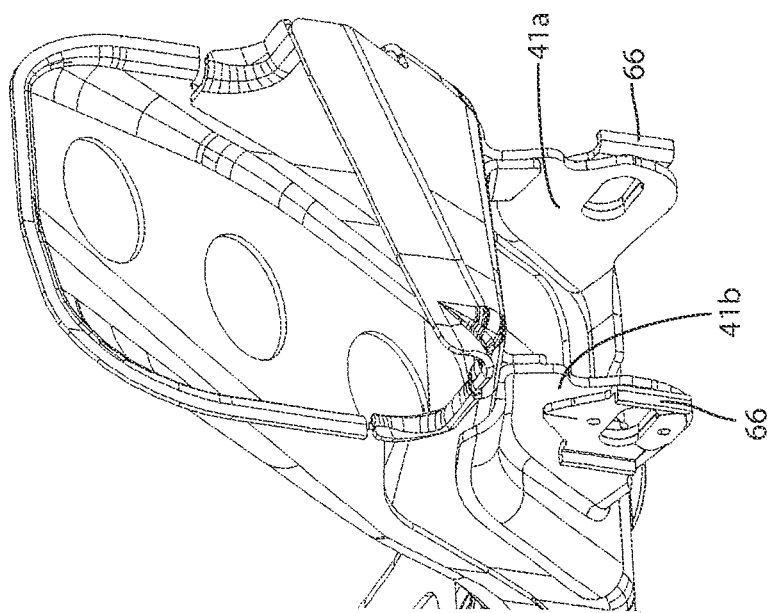
FIG. 20 is a perspective environmental view of an exemplary passenger side rear factory mount for a lower control arm of a steering knuckle illustrating a pair of mounting flanges.
Figure 21:
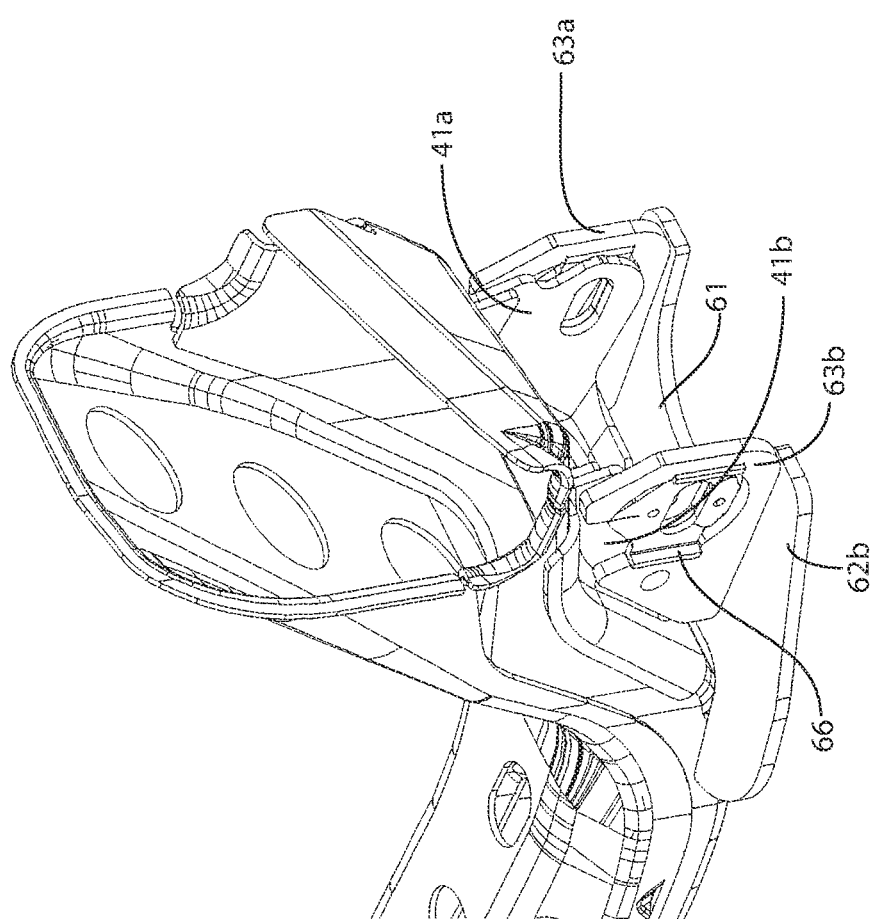
FIG. 21 is a perspective view of an embodiment of the present invention installed on a passenger side rear factory mount for a lower control arm of a steering knuckle, without any mounting hardware.
Figure 22:
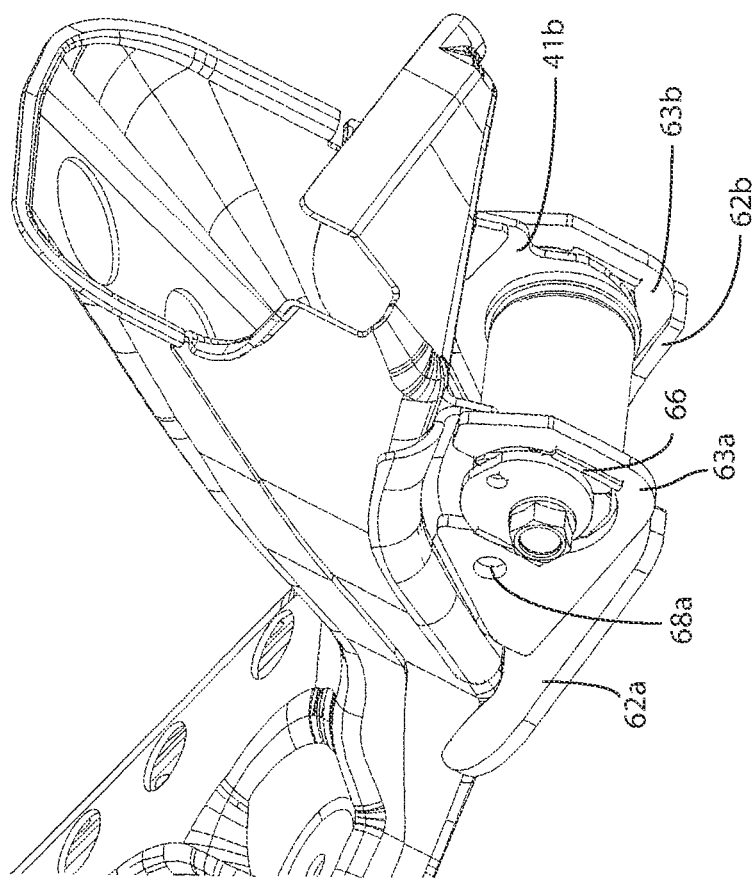
FIG. 22 is an upper perspective view of an embodiment of the present invention installed on a driver side rear factory mount for a lower control arm of a steering knuckle with mounting hardware.
Figure 23:
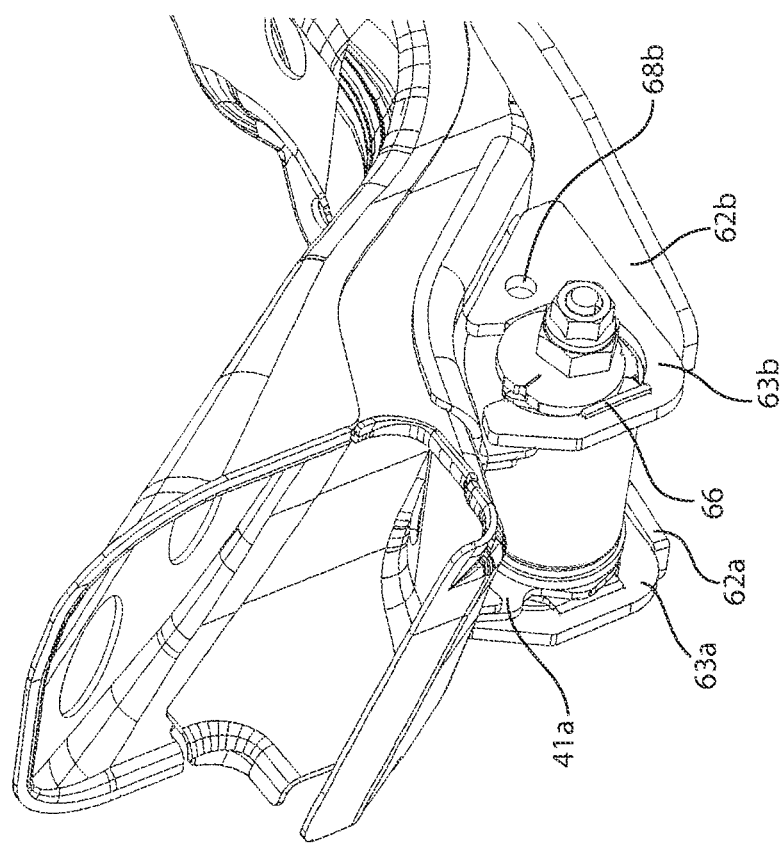
FIG. 23 is another upper perspective view of an embodiment of the present invention installed on a driver side rear factory mount for a lower control arm of a steering knuckle with mounting hardware.
Figure 24:
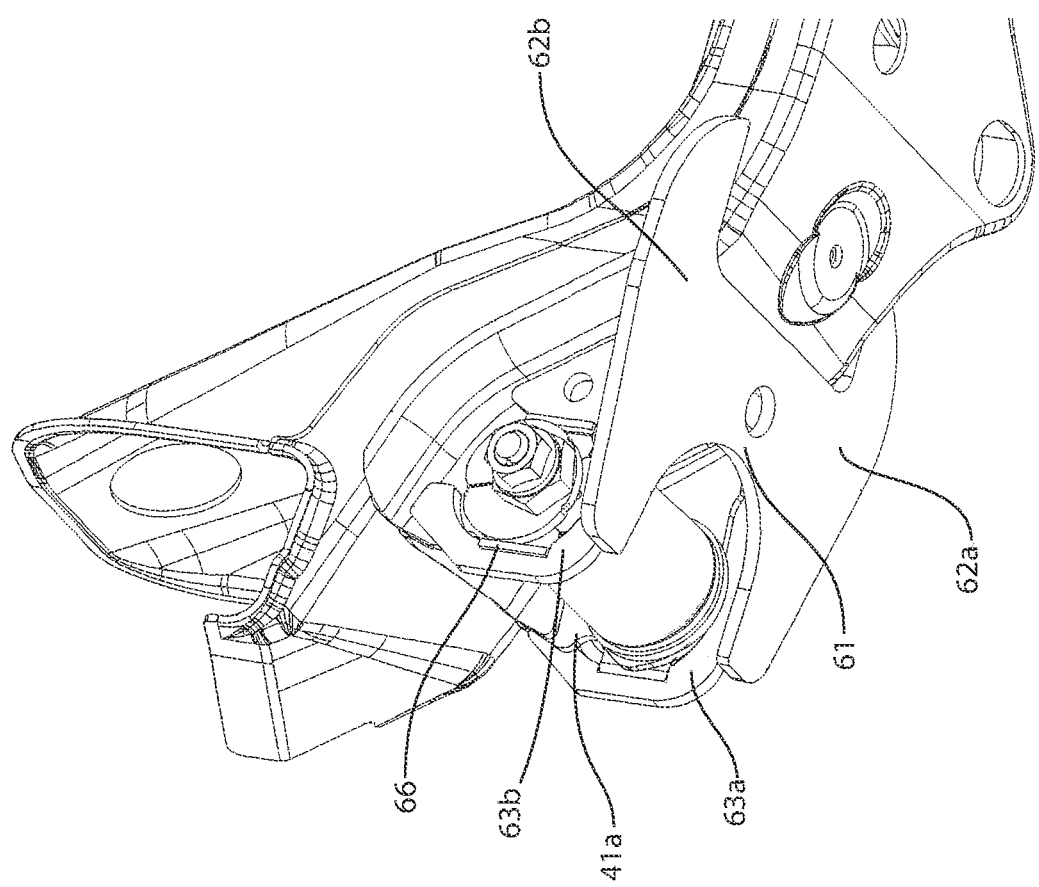
FIG. 24 is a lower perspective view of an embodiment of the present invention installed on a driver side rear factory mount for a lower control arm of a steering knuckle with mounting hardware.

An alternative embodiment of a front bracket of the invention (driver side) is illustrated in FIGS. 16-19. In these embodiments, and additional slot or recess 57 is provided on base 51 to provide access space for applying grease to the hardware of the mount. It is to be appreciated that although the views of FIGS. 16-19 illustrate embodiments for use on the driver side of a vehicle, that mirror-images of these illustrated embodiments may be provided for the passenger side of a vehicle.

Figure 25:
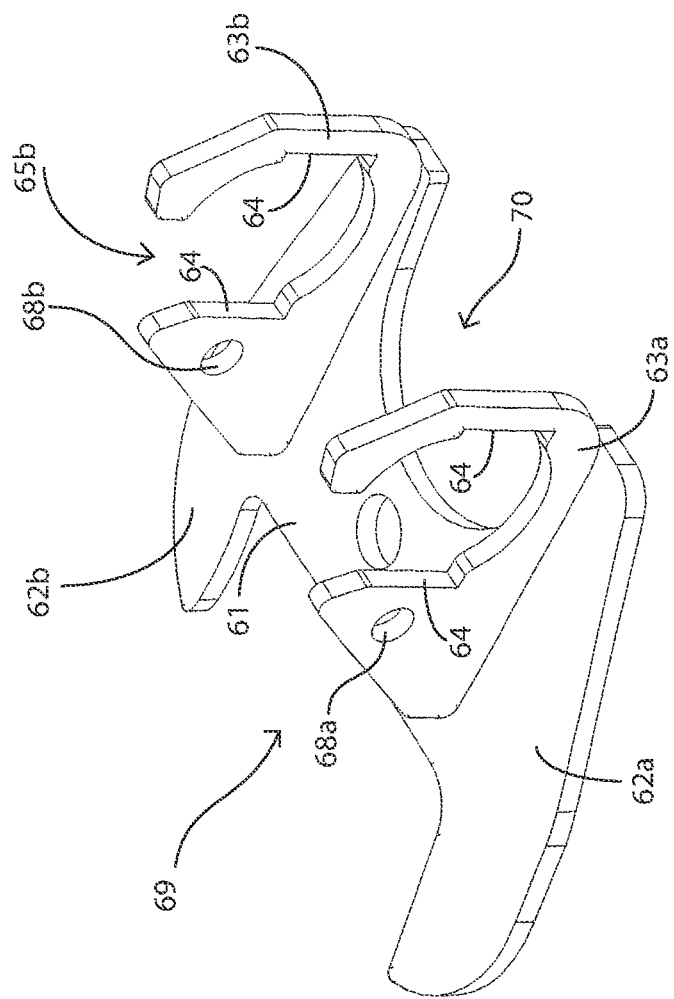
FIG. 25 is a top perspective view of an embodiment of a rear bracket of the present invention.
Figure 26:
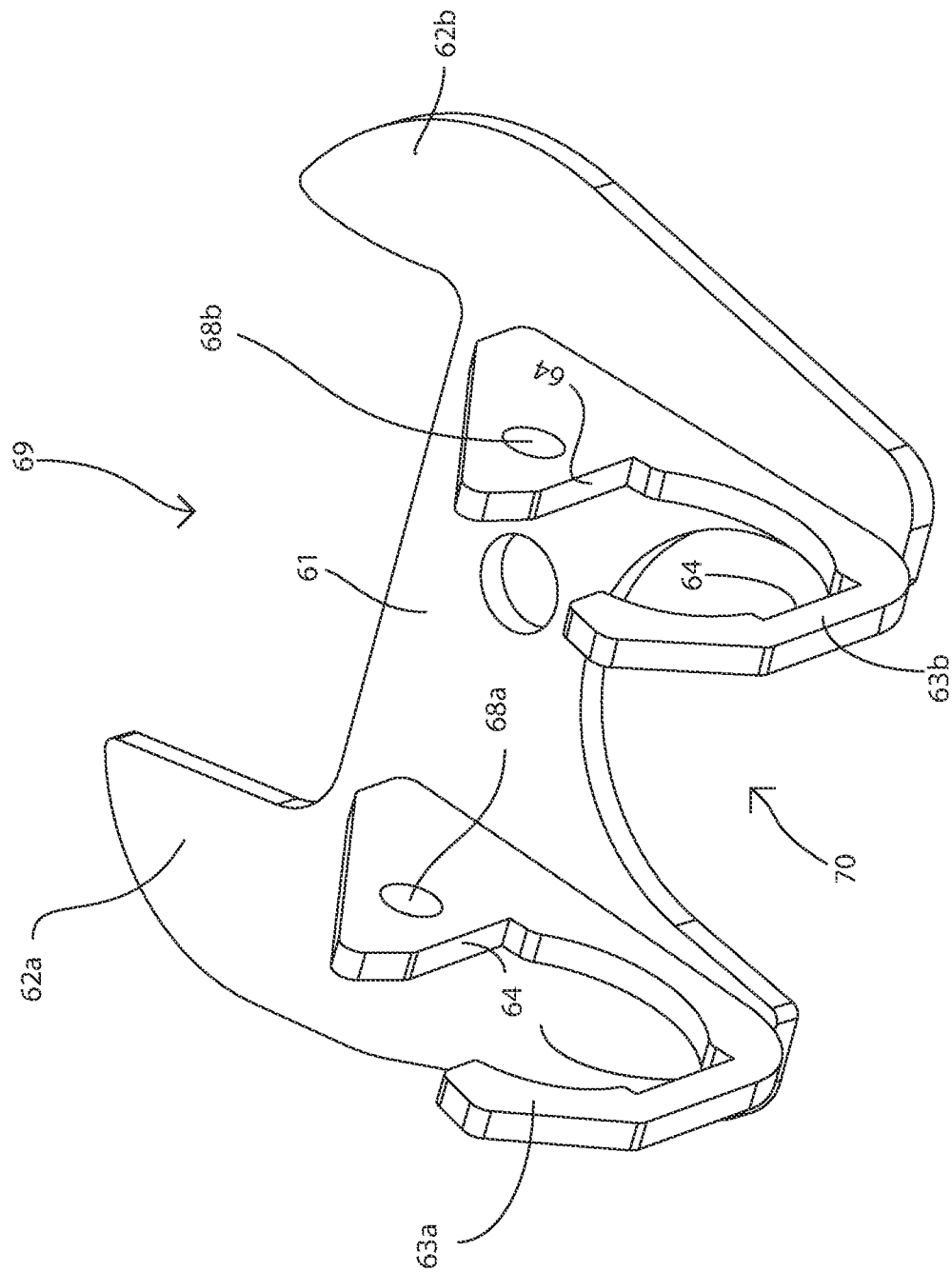
FIG. 26 is another top perspective view of the embodiment of the bracket of FIG. 25.
Figure 27:
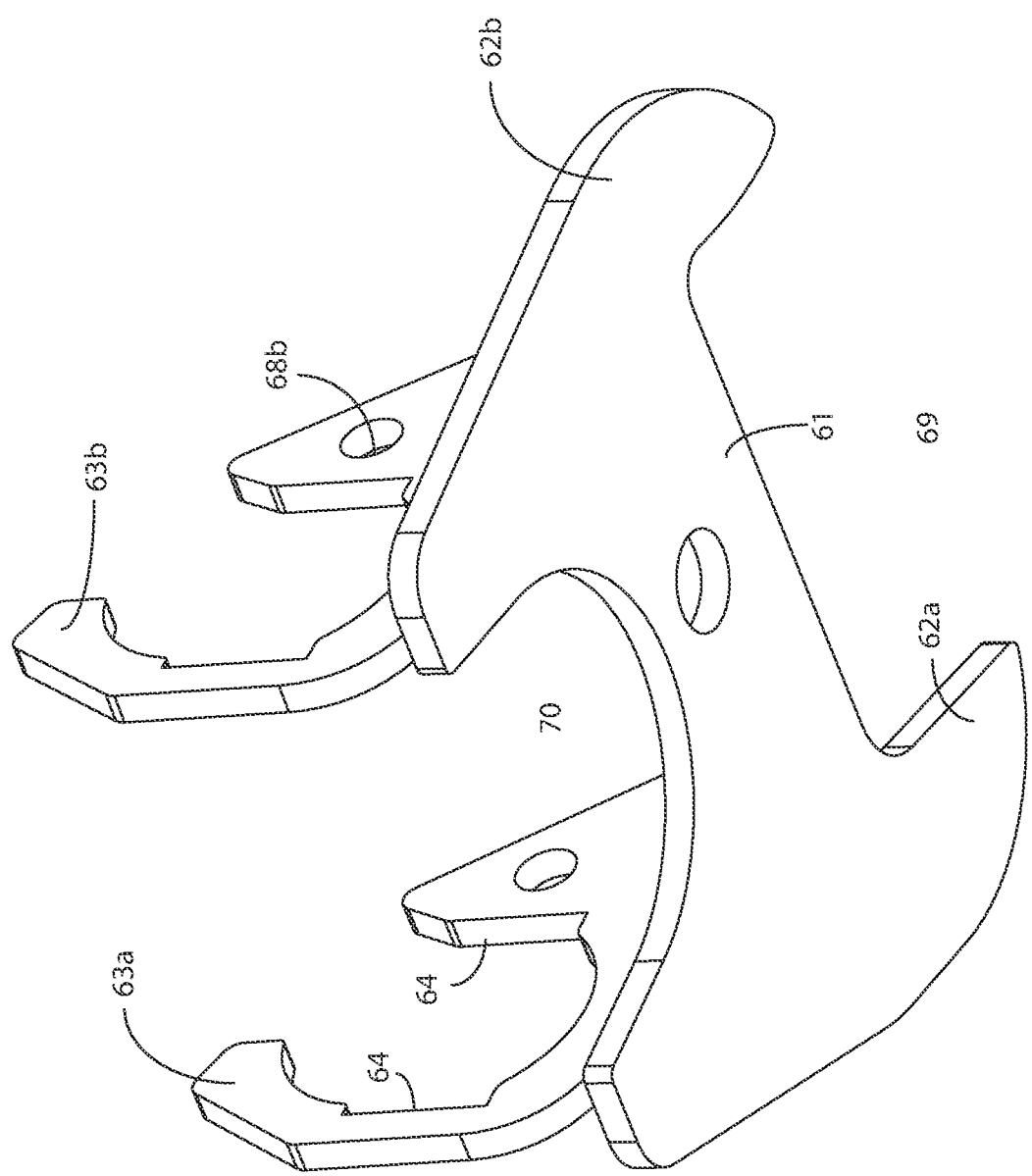
FIG. 27 is a lower perspective view of the embodiment of the bracket of FIG. 25.
Figure 28:
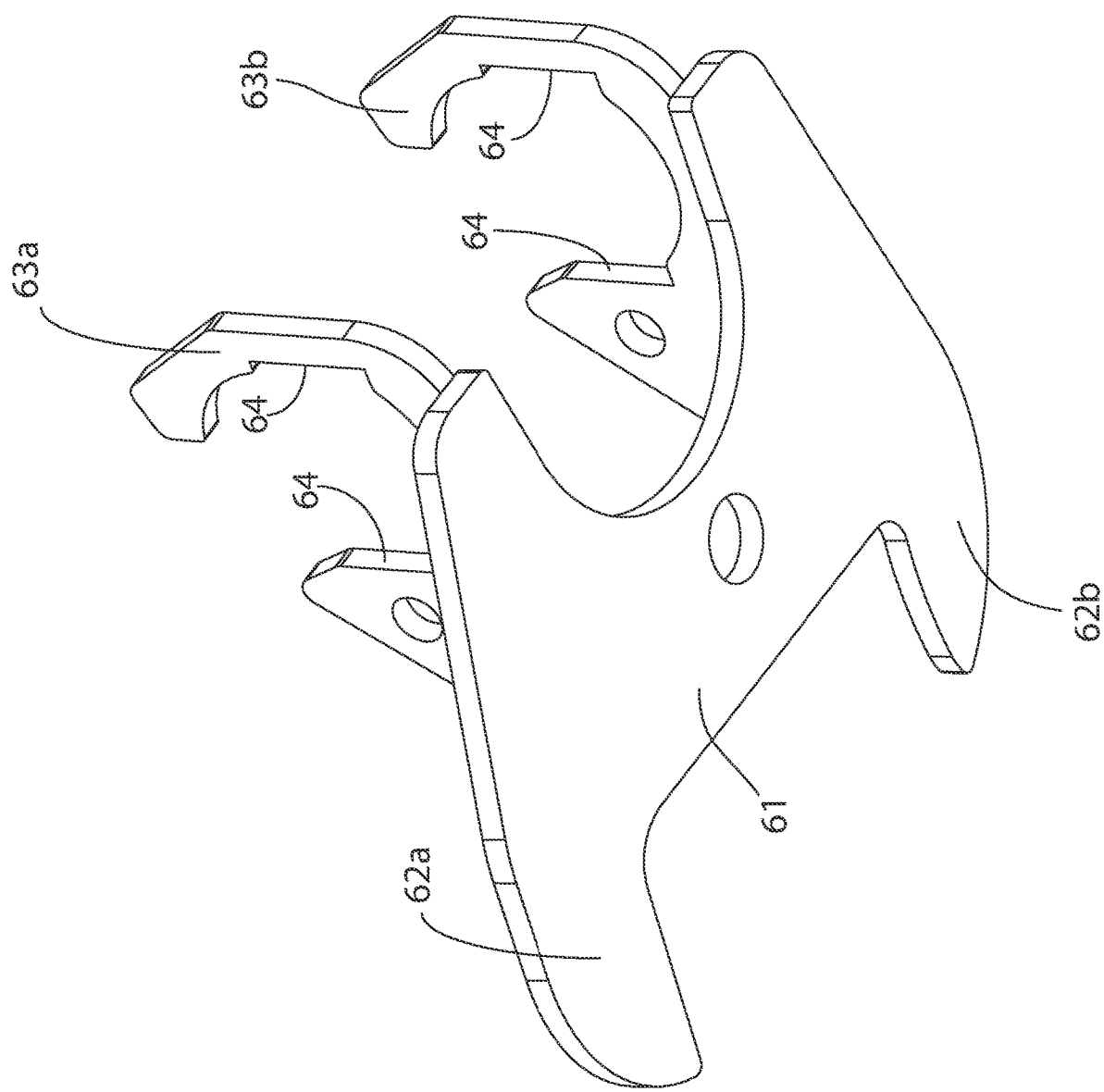
FIG. 28 is another lower perspective view of the embodiment of the bracket of FIG. 25.
Figure 29:
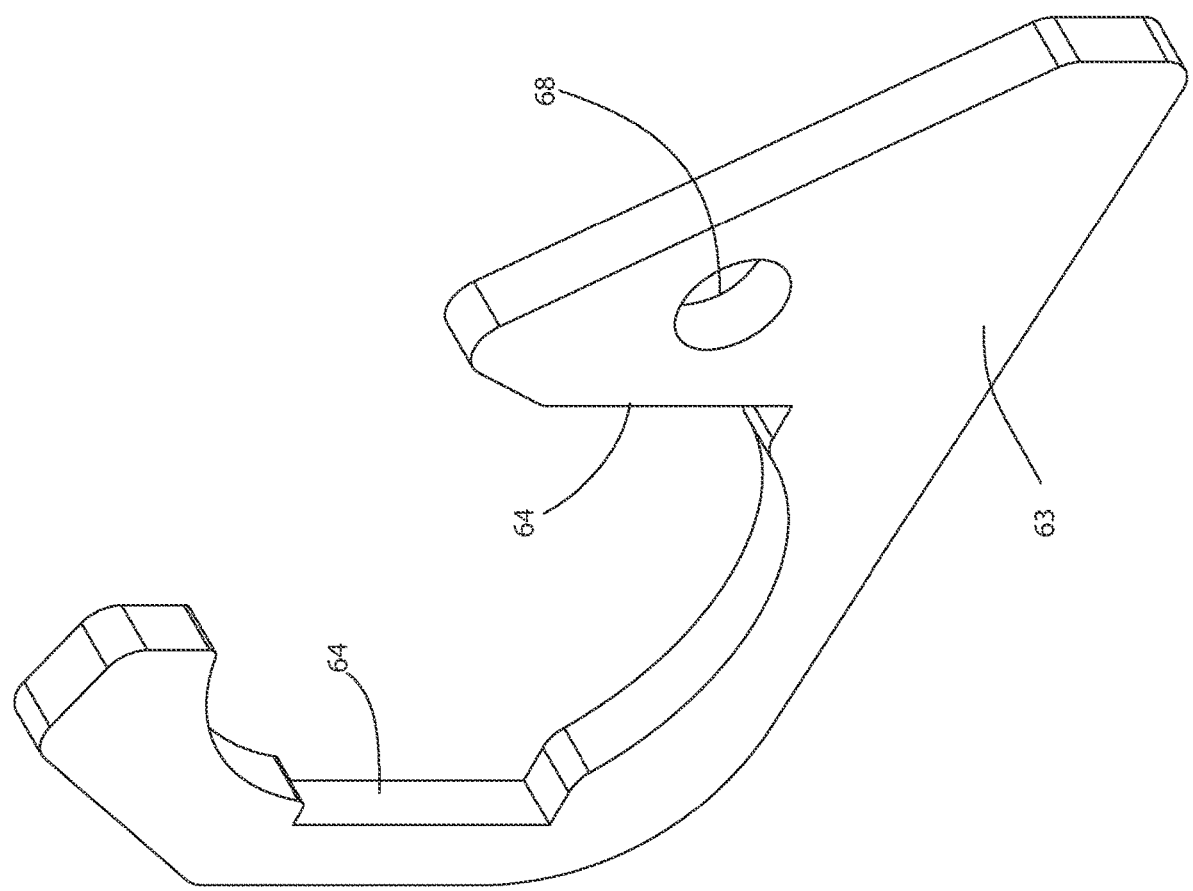
FIG. 29 is a side perspective view of an embodiment of a rear reinforcing flange of the present invention.
Figure 30:
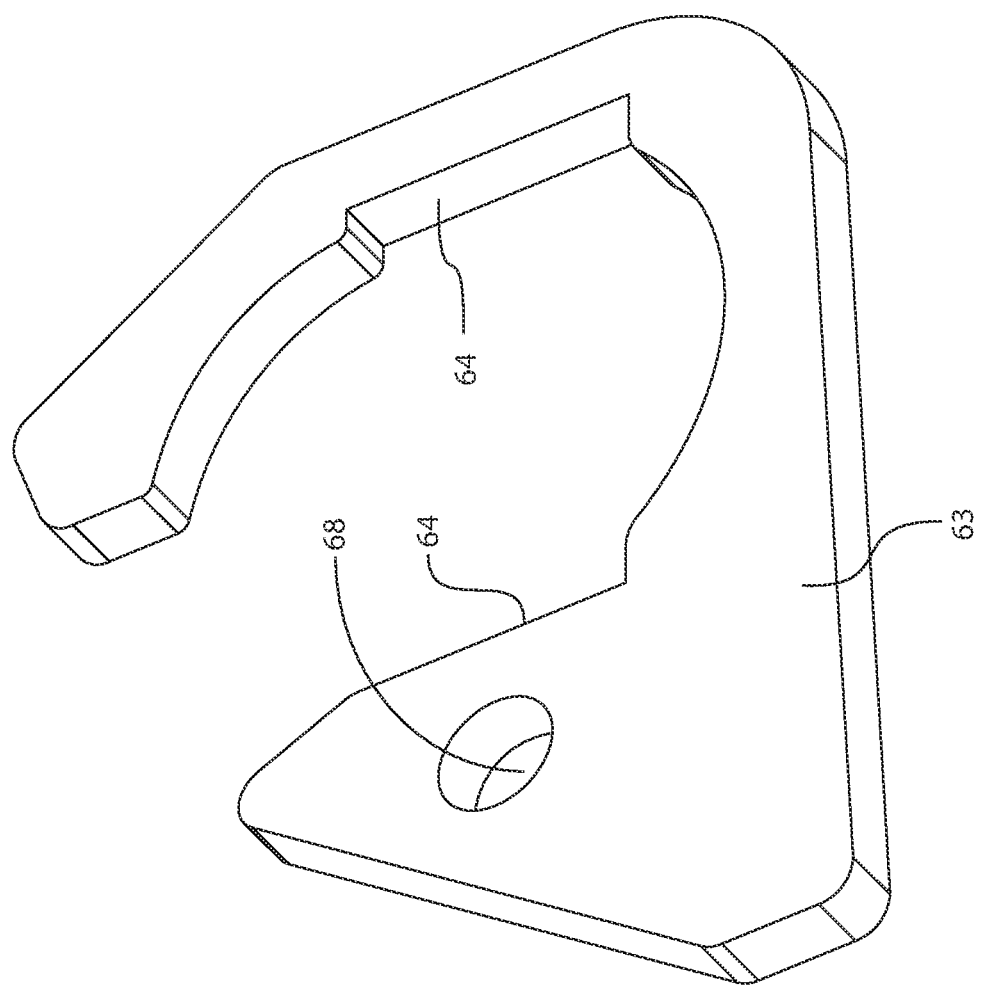
FIG. 30 is an opposite side perspective view of an embodiment of a rear reinforcing flange of the present invention
Figure 31:
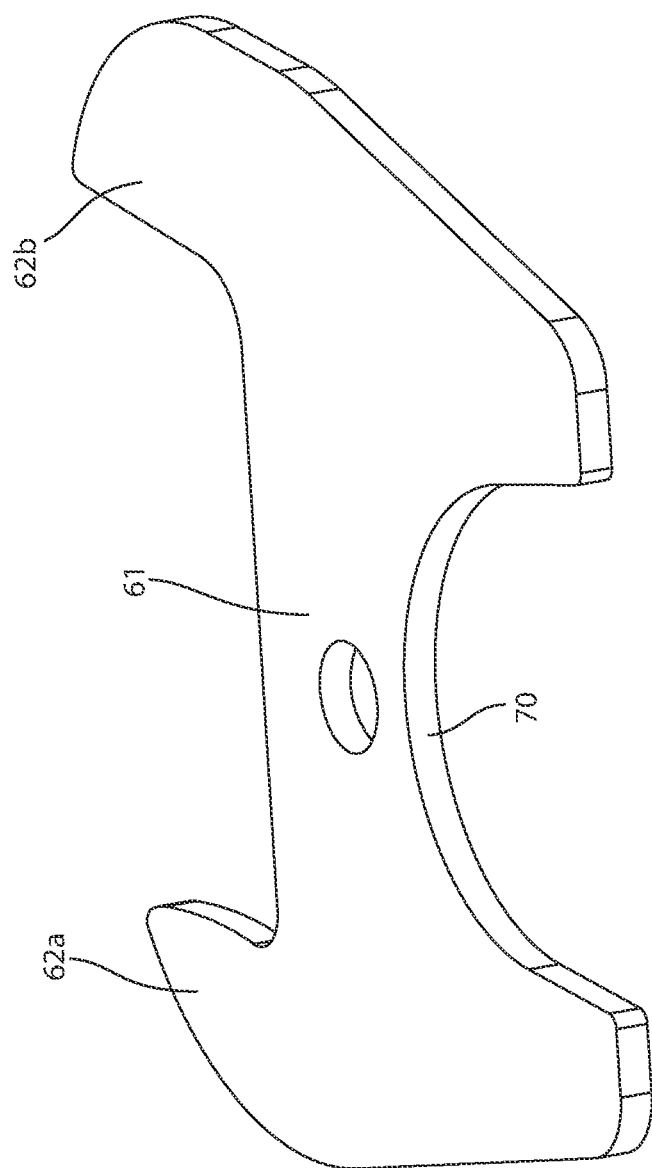
FIG. 31 is a top perspective view of an embodiment of a rear base plate of the present invention.

FIGS. 25-28 illustrate an embodiment of a rear bracket of the invention, which includes a base plate 61, and a pair of parallel generally U-shaped flanges or cams 63a, 63b that are perpendicularly attached to base plate 51. Flanges 63a, 63b provide reinforcement to the factory rear flanges 41a, 41b, and base plate 61 provides a lower shield for these flanges and related hardware against objects below the vehicle. Flanges 63a, 63b each include a slotted section 64 for engagement against a camber tab 66 of a vehicle camber plate. It is to be appreciated that in different embodiments of the invention, the size and shape of slotted sections 64 may be modified to accommodate the different size and shape of after-market camber plates and tabs 66 if these have been installed. Rear base plate 61 may include front and rear extensions 62a, 62b. Base plate 61, flanges 63a, 63b and extensions 62a, 62b should all preferably be made of sturdy metal in order to provide reinforcement and shielding to the factory mounts and cam tabs for the lower control arm of the steering knuckle. Openings 65a, 65b are provided in flanges 63a, 63b for receiving hardware for mounting the rear lower control arm to the chassis of the vehicle. An opening 69 is provided on one side of base 61, and another opening 70 is provided on the opposite side of base 61, to provide room for structures related to the vehicle wheel support to provide access space for applying grease to the hardware of the mount. Holes 68a and 68b may be provided in each flange 63a, 63b to provide additional locations for welding the flanges to the vehicle chassis. It is to be appreciated that mirror-images of these illustrated embodiments may be provided for the driver and passenger sides of a vehicle.

To install a brace of the present invention, the front steering knuckle and the lower control arm should first be removed. The hardware for mounting the lower control arm to the vehicle chassis should also be removed, with the camber plate and tabs left in place. However, in some embodiments, the braces of the present invention may be installed without removal of the lower control arm, steering knuckle, or any other related component. A front bracket of the present invention is then attached to the front mount of the lower control arm mount, and a rear bracket of the present invention is attached to the rear mount of the lower control arm. The mounting of the brackets should be such that the openings of the U-shaped flanges correspond to the openings of the chassis mounting flanges, and that slots 54 of the front mount abut against front cam tabs 56 (which may be factory or after-market tabs), and slots 64 of the rear mount abut against rear cam tabs 66 (which may also be factory or after-market tabs). The base and flanges are then welded to the vehicle chassis. It is to be appreciated that any paint on the vehicle chassis should be removed prior to welding to improve adhesion, and that once welded in place, the brackets should themselves be painted to resist rusting.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A reinforcing brace for a chassis mount for a lower control arm of a vehicle steering knuckle comprising a bracket having a flat base plate with a pair of parallel flanges extending upwardly therefrom, the parallel flanges for engagement with a pair of corresponding flanges on said chassis mount, each such flange having a generally U-shaped opening therein for receiving mounting hardware, wherein each such flange further comprises a pair of slots in the U-shaped opening for receiving camber plate tabs, and wherein said base plate and said flanges of said bracket are made of sturdy metal.

2. The reinforcing brace of claim 1 wherein said base plate further comprises forward and rear extensions for deflecting incoming objects underneath said vehicle.

3. The reinforcing brace of claim 1 wherein said base plate further comprises an elongated forward extension for deflecting incoming objects underneath said vehicle encountered while traveling forward.

4. The reinforcing brace of claim 1 wherein said base plate further comprises a recess to provide access for applying grease components of the vehicle.

5. The reinforcing brace of claim 1 wherein said parallel flanges provide reinforcement and support to said camber adjustment tabs.

6. The reinforcing brace of claim 1 wherein said U-shaped openings and slots are sized to accommodate after-market camber adjustment tabs.

7. The reinforcing brace of claim 1 wherein said base plate and said flanges of said bracket are made of steel having a thickness of about ¼ inch.

8. A method for reinforcing the chassis mounts for a lower control arm of a vehicle steering knuckle comprising the steps of:
   a. attaching a first pair of parallel metal flanges of a first bracket to corresponding parallel factory flanges of a front mount for a lower control arm of a vehicle chassis by welding said first pair of flanges to said corresponding front factory flanges, such that slots on said first flanges receive camber tabs on said corresponding front flanges, wherein said first bracket further comprises a metal base plate attached to said first pair of flanges; and
   b. attaching a second pair of parallel metal flanges of a second bracket to corresponding parallel factory flanges of a rear mount for a lower control arm of a vehicle chassis by welding said second pair of flanges to said corresponding rear factory flanges, such that slots on said second flanges receive camber tabs on said corresponding rear flanges, wherein said second bracket further comprises a metal base plate attached to said second pair of flanges.

9. The method of claim 8 comprising the additional step of, prior to any of the previous steps, removing the lower steering knuckle control arm from the vehicle chassis.

10. The method of claim 8 wherein the base plates of said first and second brackets further comprise forward and rear extensions for deflecting incoming objects underneath said vehicle.

11. The method of claim 8 wherein said base plate of said first bracket further comprises a forward extension for deflecting incoming objects underneath said vehicle encountered while traveling forward.

12. The method of claim 8 wherein said slots on said first and second pairs of flanges are sized to accommodate after-market camber adjustment tabs.

* * * * *